United States Patent [19]

Momose et al.

[11] Patent Number: 5,566,072
[45] Date of Patent: Oct. 15, 1996

[54] METHOD AND APPARATUS FOR ESTIMATING A ROAD TRAFFIC CONDITION AND METHOD AND APPARATUS FOR CONTROLLING A VEHICLE RUNNING CHARACTERISTIC

[75] Inventors: Nobuo Momose; Masayoshi Ito; Hiroaki Yoshida; Masanori Tani, all of Okazaki; Yoshiaki Sano, Anjo; Masahito Taira, Okazaki, all of Japan

[73] Assignee: Mitsubishi Jidosha Kogyo Kabushiki Kaisha, Tokyo, Japan

[21] Appl. No.: 288,039

[22] Filed: Aug. 10, 1994

[30] Foreign Application Priority Data

Aug. 10, 1993 [JP] Japan ................................. 5-198188
Dec. 29, 1993 [JP] Japan ................................. 5-351805

[51] Int. Cl.$^6$ ............................... G06F 17/00; G06F 15/20
[52] U.S. Cl. ......................... 364/436; 364/438; 364/446; 395/905; 395/913
[58] Field of Search ................................. 364/436, 437, 364/438, 426.04, 424.01, 424.05, 446; 395/900, 905, 930, 21, 913; 180/140, 141, 142, 143; 123/399

[56] References Cited

U.S. PATENT DOCUMENTS

| | | | |
|---|---|---|---|
| 4,747,055 | 5/1988 | Eto et al. | 364/424.01 |
| 4,763,745 | 8/1988 | Eto et al. | 180/143 |
| 4,773,010 | 9/1988 | Suzuki et al. | 364/424.05 |
| 4,853,720 | 8/1989 | Onari et al. | 364/431.07 |
| 4,862,854 | 9/1989 | Oda et al. | 123/399 |
| 5,162,997 | 11/1992 | Takahashi | 364/424.05 |
| 5,172,785 | 12/1992 | Takahashi | 180/141 |
| 5,182,710 | 1/1993 | Tomisawa | 364/424.1 |
| 5,189,621 | 2/1993 | Onari et al. | 364/431.04 |
| 5,285,523 | 2/1994 | Takahashi | 395/22 |

FOREIGN PATENT DOCUMENTS

| | | |
|---|---|---|
| 3300640 | 7/1984 | Germany . |
| 4001347 | 7/1990 | Germany . |
| 4103067 | 8/1991 | Germany . |
| 1-119440 | 5/1989 | Japan . |
| 3-224832 | 10/1991 | Japan . |
| 5198188 | 8/1993 | Japan . |
| 5351805 | 12/1993 | Japan . |

OTHER PUBLICATIONS

Bosachi et al., "Fuzzy Logic Technology & the Intelligence Highwave System (IHS)", IEEE 1993, pp. 65–70.
Neuper et al., "Developments in Autonomous Vehicle Navigation" IEEE 1992, pp. 453–458.
Niehaus et al., "Probability–Based Decision Making for Automated Highway Driving", IEEE 1994, pp. 626–634.

*Primary Examiner*—Kevin J. Teska
*Assistant Examiner*—Tan Nguyen

[57] ABSTRACT

An apparatus for estimating a road traffic condition and for controlling a vehicle running characteristic includes a controller having a fuzzy inference function and a neural network function. The controller carries out frequency analysis on vehicle driving parameters such as vehicle speed, steering angle, accelerator opening degree, and longitudinal acceleration and lateral acceleration of a vehicle, to thereby determine a mean value and variance of each parameter. It implements fuzzy inference based on a traveling time ratio, an average speed, and an average lateral acceleration, which are obtained from vehicle speed and/or steering angle, to thereby calculate road traffic condition parameters, including a city area degree, a jammed road degree, and a mountainous road degree. According to the neural network function, the controller further determines an output parameter, indicative of the vehicle maneuvering state, by subjecting the mean value and variance of the vehicle driving parameters and the weighted total sum of the road traffic condition parameters to nonlinear conversion. Then, it variably controls the operating characteristic of a vehicle-mounted apparatus such as a rear-wheel steering controlling unit in accordance with the output parameter, thereby variably controlling the vehicle running characteristic.

60 Claims, 27 Drawing Sheets

METHOD AND APPARATUS FOR ESTIMATING A ROAD TRAFFIC CONDITION AND METHOD AND APPARATUS FOR CONTROLLING A VEHICLE RUNNING CHARACTERISTIC

BACKGROUND OF THE INVENTION

1. Field of the Invention

The present invention relates to a method and apparatus for estimating a road traffic condition, and a method and apparatus for controlling a running characteristic of a vehicle to adapt the same to the road traffic condition estimated by the aforementioned estimating method and apparatus.

2. Description of the Related Art

A vehicle is equipped with various apparatuses to improve the traveling stability, maneuverability, riding comfort, etc. of the vehicle.

For instance, a vehicle is provided with an electronic fuel supply controller to optimally control the quantity of fuel supplied to an engine in accordance with the vehicle running state represented by a vehicle speed, the opening degree of an accelerator pedal, etc.; an automatic transmission for selecting a gearshift position optimum for the current vehicle running state; and an anti-skid brake system for providing optimum braking power. The vehicle is further equipped with a traction control system for ensuring an optimum slip ratio of driving wheels; a four-wheel steering system for steering rear wheels in the case of turning front-wheels; an active suspension system for variably changing suspension characteristics; and an electric power steering system for variably adjusting the steering power.

The vehicle provided with the aforementioned systems features high maneuverability and running stability, and satisfies, to a great extent, the performance required of a vehicle.

A control method for estimating a traveling state of a vehicle and for controlling various apparatuses so as to be suited to the estimated traveling state (road traffic condition), to thereby permit these apparatuses to fully exhibit their performances has been conventionally known. As parameters from which the traveling state is estimated, a distance between vehicles, a time period elapsed from the moment a vehicle starts to run to the moment the vehicle stops running, a maximum vehicle speed, etc. (see, Japanese Provisional Patent Publication No. 1-119440, for instance).

However, a costly device such as an ultrasonic wave sensor is required to estimate the traveling state (road traffic condition) based on a distance between vehicles. If the estimation on the traveling state is made based on a time period elapsed from the start of vehicle running to the stop of vehicle running, there occurs a small change in an output value even when the vehicle running state changes. Thus, the accuracy of estimation is low. Further, response to a changeover between traveling states, e.g., a changeover from a state where a vehicle travels in a city area to a state where the vehicle travels in an urban district, is poor. Moreover, it is difficult to accurately determine the traveling state based on a maximum speed since the maximum speed varies between individual drivers.

SUMMARY OF THE INVENTION

An object of the present invention is to provide a road traffic condition estimating method and apparatus for accurately estimating a road traffic condition on which an actual traveling state is reflected.

Another object of the present invention is to provide a vehicle running characteristic controlling method and apparatus for controlling a vehicle running characteristic so as to be adapted to the road traffic condition estimated by the aforesaid estimating method and apparatus, thereby enabling vehicle drive suited to an overall vehicle driving state, which includes the road traffic condition.

According to a first aspect of the present invention, there is provided a road traffic condition estimating method for estimating a road traffic condition based on a traveling state of a vehicle. This method comprises the steps of: (a) calculating a traveling time ratio of the vehicle; (b) calculating an average speed of the vehicle; and (c) estimating the road traffic condition based on said traveling time ratio and said average speed.

This method makes it possible to accurately estimate a road traffic condition on which an actual traveling state is reflected. In addition, influences of differences between individual drivers in maneuvering a vehicle upon the estimation of a road traffic condition can be reduced. Moreover, the calculation of the traveling time ratio and average speed can be easily carried out by use of a vehicle speed sensor and a timer, for instance. This makes it unnecessary to use a costly sensor, etc., so that the estimation of a road traffic condition can be realized at low costs.

Preferably, said step (c) includes estimating a city area degree, as the road traffic condition. More preferably, said step (c) includes determining that said city area degree is high when said traveling time ratio and said average speed are at a low or medium level. Alternatively, said step (c) includes carrying out fuzzy inference on said city area degree based on a plurality of fuzzy rules, said plurality of fuzzy rules including a fuzzy rule by which said city area degree is determined to be high when said traveling time ratio and said average speed are at a low level, and a fuzzy rule by which said city area degree is determined to be high when said traveling time ratio and said average speed are at a medium level.

Preferably, said step (c) includes estimating an expressway degree based on a value which is obtained by subtracting said city area degree from a maximum value of said city area degree, said maximum value being restricted up to a predetermined value.

Preferably, said step (c) includes estimating a jammed road degree as said road traffic condition. More preferably, said step (c) includes determining that said jammed road degree is high when said traveling time ratio or said average speed are at a low level. Alternatively, said step (c) includes carrying out fuzzy inference on said jammed road degree based on a plurality of fuzzy rules, said plurality of fuzzy rules including a fuzzy rule by which said jammed road degree is determined to be high when said traveling time ratio is at a low level, and a fuzzy rule by which said jammed road degree is determined to be high when said average speed is at a low level.

Preferably, the estimating method further includes the steps of: (d) calculating an average lateral acceleration; and (e) determining a mountainous road degree based said average lateral acceleration. Said step (c) includes estimating a city area degree and/or a jammed road degree. More preferably, said step (e) includes determining said mountainous road degree based on a map having a characteristic in which said mountainous road degree increases with an increase in said average lateral acceleration.

According to the aforementioned preferred embodiments of the present invention, it is possible to estimate various road traffic conditions including a mountainous degree, an expressway degree, etc.

According to a second aspect of the present invention, there is provided a vehicle running characteristic control method in which a running characteristic of a vehicle is variably controlled by variably controlling an operating characteristic of an apparatus mounted on the vehicle. This method comprises the steps of: (a) calculating a traveling time ratio of the vehicle; (b) calculating an average speed of the vehicle; (c) estimating a road traffic condition based on said traveling time ratio and said average speed; and (d) variably controlling the operating characteristic of the apparatus mounted on the vehicle in accordance with the road traffic condition.

Preferably, said step (d) includes variably controlling an operating characteristic of a rear-wheel steering apparatus, which serves as the apparatus mounted on the vehicle and which sets a target rear-wheel steering angle by multiplying a detected value of a front-wheel steering state or a detected value of a vehicle behavior by a coefficient, by variably controlling said coefficient in accordance with said road traffic condition. Alternatively, said step (d) includes variably controlling a steering reaction force vs. vehicle speed characteristic of a power steering unit in accordance with said road traffic condition, the power steering unit serving as the apparatus mounted on the vehicle and changing a steering reaction force in accordance with vehicle speed. Alternatively, said step (d) includes variably setting a speed change map in accordance with said road traffic condition, the map being based on vehicle speed and throttle opening degree and being provided on an automatic transmission which serves as the apparatus mounted on the vehicle. Further alternatively, said step (d) includes variably controlling an accelerator operation vs. engine output characteristic of an engine output control unit in accordance with said road traffic condition, the engine output control unit serving as the apparatus mounted on the vehicle.

The method according to the aforementioned second aspect of the present invention makes it possible to control the vehicle running characteristic to be adapted to the estimated result of the road traffic condition. In addition, a vehicle running characteristic required by an individual driver in various road traffic conditions. This permits vehicle drive suited to an overall vehicle driving condition which includes a road traffic condition. Moreover, the methods according to the aforesaid preferred embodiments of the present invention make it possible to control the rear-wheel steering characteristic of the rear-wheel steering apparatus, the steering power characteristic of the power steering unit, the shift feeling of the automatic transmission, or the operating characteristic of the engine output control unit so as to be adapted to the road traffic condition.

According to a third aspect of the present invention, there is provided a road traffic condition estimating apparatus for estimating a road traffic condition based on a traveling state of a vehicle. This apparatus comprises: traveling time ratio detecting means for calculating a traveling time ratio of the vehicle; average speed detecting means for calculating an average speed of the vehicle; and road traffic condition estimating means for estimating the road traffic condition based on said traveling time ratio and said average speed.

Preferably, said road traffic condition estimating means estimates a city area degree, as the road traffic condition. More preferably, said road traffic condition estimating means determines that said city area degree is high when said traveling time ratio and said average speed are at a low or medium level. Alternatively, said road traffic condition estimating means carries out fuzzy inference on said city area degree based on a plurality of fuzzy rules, said plurality of fuzzy rules including a fuzzy rule by which said city area degree is determined to be high when said traveling time ratio and said average speed are at a low level, and a fuzzy rule by which said city area degree is determined to be high when said traveling time ratio and said average speed are at a medium level.

Preferably, said road traffic condition estimating means estimates an expressway degree based on a value which is obtained by subtracting said city area degree from a maximum value of said city area degree, said maximum value being restricted up to a predetermined value.

Preferably, said road traffic condition estimating means estimates a jammed road degree as said road traffic condition. More preferably, said road traffic condition estimating means determines that said jammed road degree is high when said traveling time ratio or said average speed are at a low level. Alternatively, said road traffic condition estimating means carries out fuzzy inference on said jammed road degree based on a plurality of fuzzy rules, said plurality of fuzzy rules including a fuzzy rule by which said jammed road degree is determined to be high when said traveling time ratio is at a low level, and a fuzzy rule by which said jammed road degree is determined to be high when said average speed is at a low level.

Preferably, the estimating apparatus further includes: average lateral acceleration detecting means for calculating an average lateral acceleration; and mountainous road degree estimating means for determining a mountainous road degree based said average lateral acceleration. Said road traffic condition estimating means estimates a city area degree and/or a jammed road degree. More preferably, said mountainous road degree estimating means determines said mountainous road degree based on a map having a characteristic in which said mountainous road degree increases with an increase in said average lateral acceleration.

According to the apparatus of the third aspect of the present invention or the preferred embodiments thereof, a corresponding one or ones of the aforementioned advantages, provided by the methods according to the first aspect of the invention and the preferred embodiments thereof can be attained.

According to a fourth aspect of the present invention, there is provided a vehicle running characteristic control apparatus in which a running characteristic of a vehicle is variably controlled by variably controlling an operating characteristic of an apparatus mounted on the vehicle. This apparatus comprises: traveling time ratio detecting means for calculating a traveling time ratio of the vehicle; average speed detecting means for calculating an average speed of the vehicle; road traffic condition estimating means for estimating a road traffic condition based on said traveling time ratio and said average speed; and characteristic controlling means for variably controlling the operating characteristic of the apparatus mounted on the vehicle in accordance with the road traffic condition.

Preferably, said characteristic controlling means variably controls an operating characteristic of a rear-wheel steering apparatus, which serves as the apparatus mounted on the vehicle and which sets a target rear-wheel steering angle by multiplying a detected value of a front-wheel steering state or a detected value of a vehicle behavior by a coefficient, by variably controlling said coefficient in accordance with said road traffic condition. Alternatively, said characteristic controlling means variably controls a steering reaction force vs. vehicle speed characteristic of a power steering unit in accordance with said road traffic condition, the power steering unit serving as the apparatus mounted on the vehicle and changing a steering reaction force in accordance with vehicle speed. Alternatively, said characteristic controlling means variably sets a speed change map in accordance with said road traffic condition, the map being based on vehicle speed and throttle opening degree and being provided on an automatic transmission which serves as the apparatus mounted on the vehicle. Further alternatively, said characteristic controlling means variably controls an accelerator operation vs. engine output characteristic of an engine output control unit in accordance with said road traffic condition, the engine output control unit serving as the apparatus mounted on the vehicle.

According to the apparatus of the fourth aspect of the present invention or the preferred embodiments thereof, a corresponding one or ones of the aforementioned advantages, provided by the method according to the second aspect of the invention and the preferred embodiments can be attained.

These and other objects and advantages will become more readily apparent from an understanding of the preferred embodiments described below with reference to the following drawing figures.

BRIEF DESCRIPTION OF THE DRAWINGS

The invention will become more fully understood from the detailed description given herein below with reference to the accompanying figures, given by way of illustration only and not intended to limit the present invention in which.

DESCRIPTION OF THE PREFERRED EMBODIMENTS

A method for estimating a road traffic condition, a method for controlling vehicle running characteristic, and apparatuses for carrying out these methods will now be described with reference to the attached drawings.

An estimating method according to a first embodiment of the present invention is designed to estimate a road traffic condition in accordance with vehicle traveling state parameters, and to estimate a vehicle maneuvering state given by a driver, on the basis of the thus determined road traffic condition and physical quantities indicative of a vehicle driving state.

Figure 1:
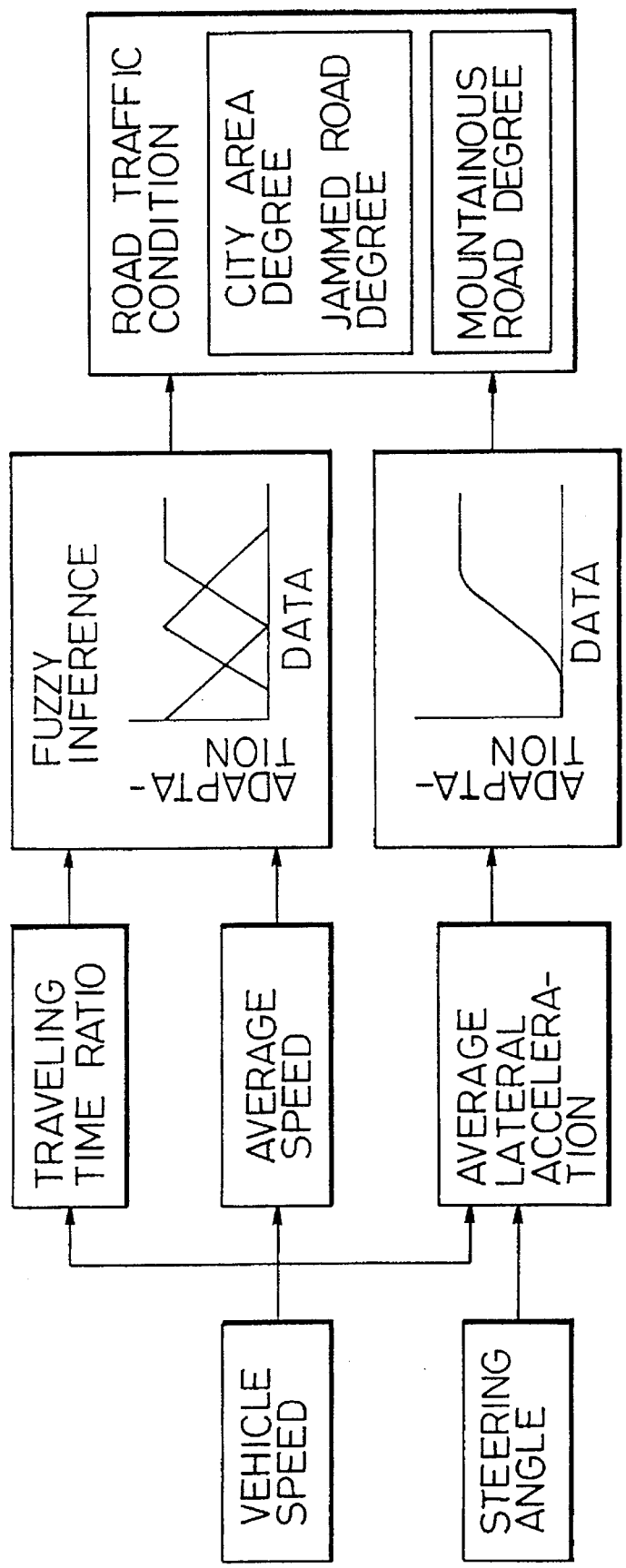
FIG. 1 is a conceptual view showing a road traffic condition determining procedure in a road traffic condition estimating method according to a first embodiment of the present invention.

To be more specific, as shown in FIG. 1, an average speed, a traveling time ratio (a ratio of the traveling time to the total time including the vehicle traveling time and the vehicle stopping time), and an average lateral acceleration are determined, as vehicle traveling state parameters, from the vehicle speed and the steering wheel angle. Further, a city area degree, a road congestion degree, and a mountainous road degree are detected, as parameters indicative of the road traffic condition, by fuzzy inference based on the vehicle traveling state parameters.

Figure 2:
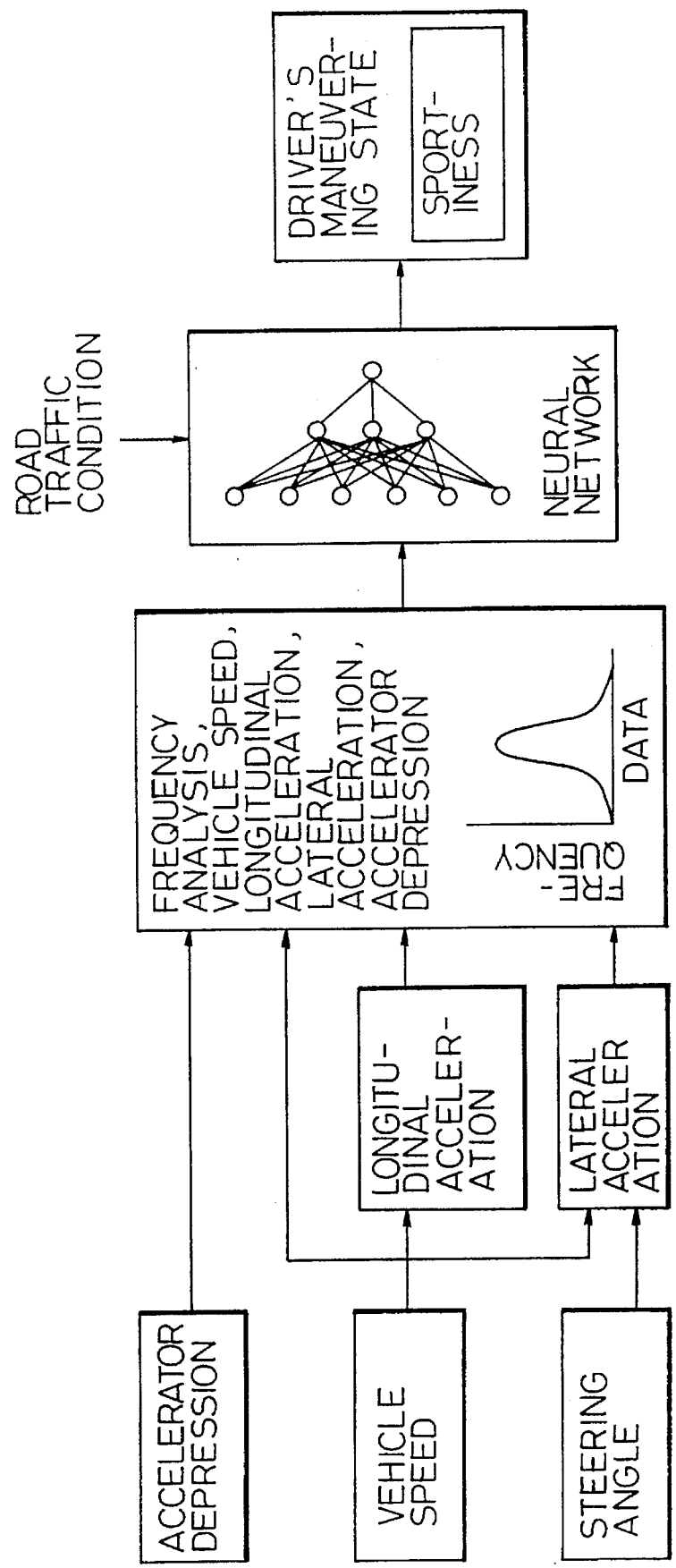
FIG. 2 is a conceptual view showing a vehicle maneuvering state determining procedure in the embodiment.

On the other hand, as shown in FIG. 2, physical quantities such as the opening degree of an accelerator, vehicle speed, and steering wheel angle, which represent the vehicle driving state, are detected. Then, the longitudinal acceleration is determined from the vehicle speed by arithmetic operation, and the lateral acceleration is determined from the vehicle speed and the steering wheel angle by arithmetic operation. Further, the frequency distribution of each of the vehicle speed, the opening degree of the accelerator, the longitudinal acceleration, and the lateral acceleration, which are vehicle driving parameters, is determined by frequency analysis. Then, the mean value and variance of each frequency distribution are determined as parameters which characterize the frequency distribution.

Further, the road traffic condition representative parameters (city area degree, road traffic jam degree, and mountainous road degree) and the parameters (the mean value and the variance) characterizing the frequency distribution of each vehicle driving parameter are supplied to a neural network. The neural network determines a weighted total sum of these parameters, thereby determining an output parameter, indicative of the vehicle maneuvering state intended by the driver, e.g., the sportiness of the driver in driving the vehicle.

Figure 3:
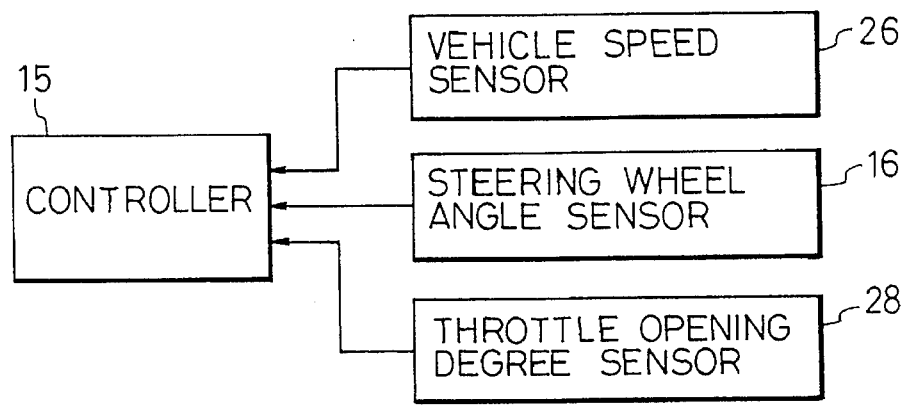
FIG. 3 is a schematic block diagram showing a controller and sensors for implementing the estimating method according to the embodiment.

A vehicle, to which the estimating method according to this embodiment is applied, is provided with a controller 15, as shown in FIG. 3. Although the illustration is omitted, the controller 15 includes a processor having a fuzzy inference function and a neural network function, a memory storing various control programs and various data, and I/O circuits. Connected to the controller 15 are a vehicle speed sensor 26, a steering wheel angle sensor 16, and a throttle opening degree sensor 28.

The processor of the controller 15 receives a vehicle speed signal from the sensor 26, a steering wheel angle signal from the sensor 16, and a throttle opening degree signal from the sensor 28, and executes various routines, to be discussed later, in order to estimate the sportiness of the driver. "Traveling time ratio calculating routine"

Figure 4:
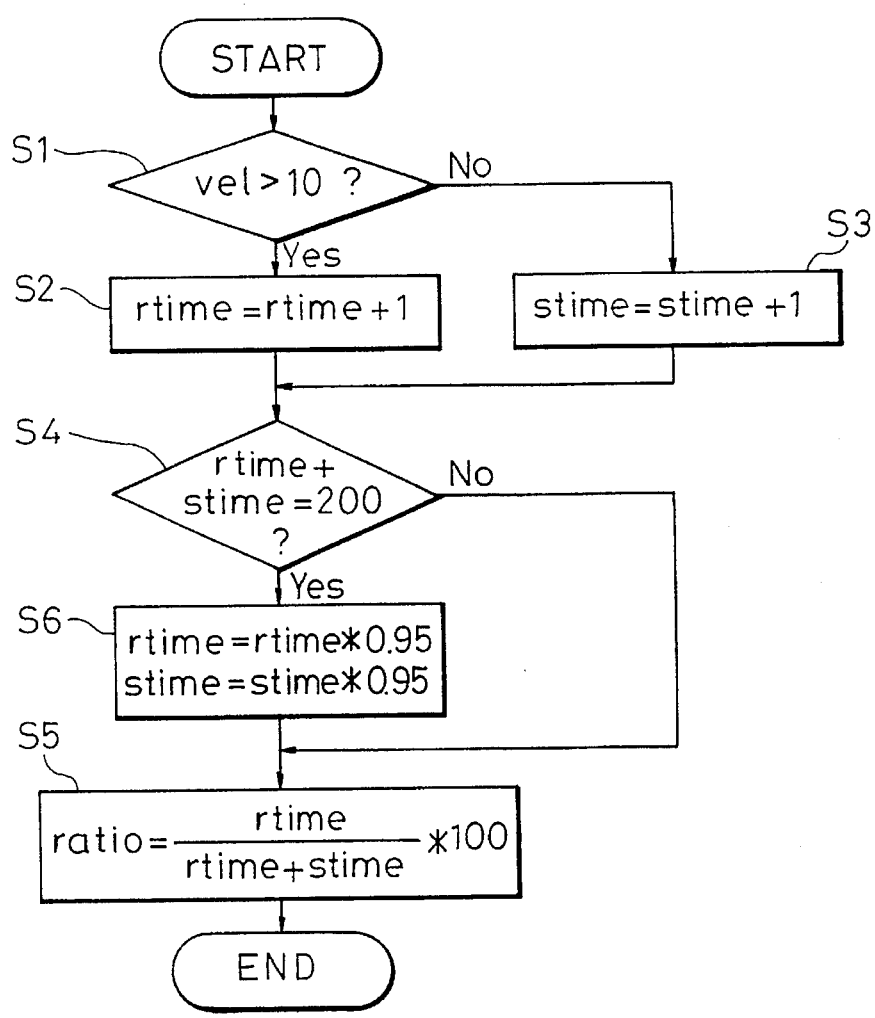
FIG. 4 is a flowchart of a traveling time ratio calculating routine executed by the controller shown in FIG. 3.

While the vehicle is in a driven state (including the traveling state and traveling stop state), e.g., after the engine is started, the processor of the controller 15 repeatedly implements the routine for calculating the traveling time ratio shown in FIG. 4 at intervals of two seconds.

In each calculating routine executing cycle, the processor receives a vehicle signal "vel," indicative of an actual vehicle speed, from the vehicle speed sensor 26, and determines whether the vehicle speed "vel" exceeds a predetermined vehicle speed (e.g., 10 km/h) (step S1). If the determination result is affirmative, then "1" is added to a count value "rtime" of a traveling time counter (not shown) built in the controller 15 (step S2). On the other hand, if the determination result in the step S1 is negative, then "1" is added to a count value "stime" of a traveling stop time counter (not shown) (step S3).

In a step S4, which follows the step S2 or S3, it is determined whether the sum of the value "rtime" of the traveling time counter and the value "stime" of the traveling stop time counter is equal to a value "200." If the determination result is negative, then a value, which is obtained by dividing the traveling time counter value "rtime" by the sum of the value and the traveling stop time counter value "stime," is multiplied by a value "100" to calculate the traveling time ratio "ratio" (%) (step S5).

On the other hand, if the determination result of the step S4 is affirmative, then a value, which is equal to the product of the traveling time counter value "rtime" and a value "0.95," is reset in the traveling time counter. In addition, a value, which is equal to the product of the traveling stop time counter value "stime" and the value "0.95" is reset in the traveling stop time counter (step S6), and the traveling time ratio "ratio" is calculated in the step S5.

In other words, the two counter values are reset when 400 seconds, which is equivalent to the value "200" and during which the vehicle has been driven, has elapsed from the time when the engine was started. After that, the counter values are reset each time 20 seconds elapse. This makes it possible to calculate the traveling time ratio, which reflects the vehicle driving state before the present time, even by means of counters with relatively small capacities.

"Average speed calculating routine"

Figure 5:
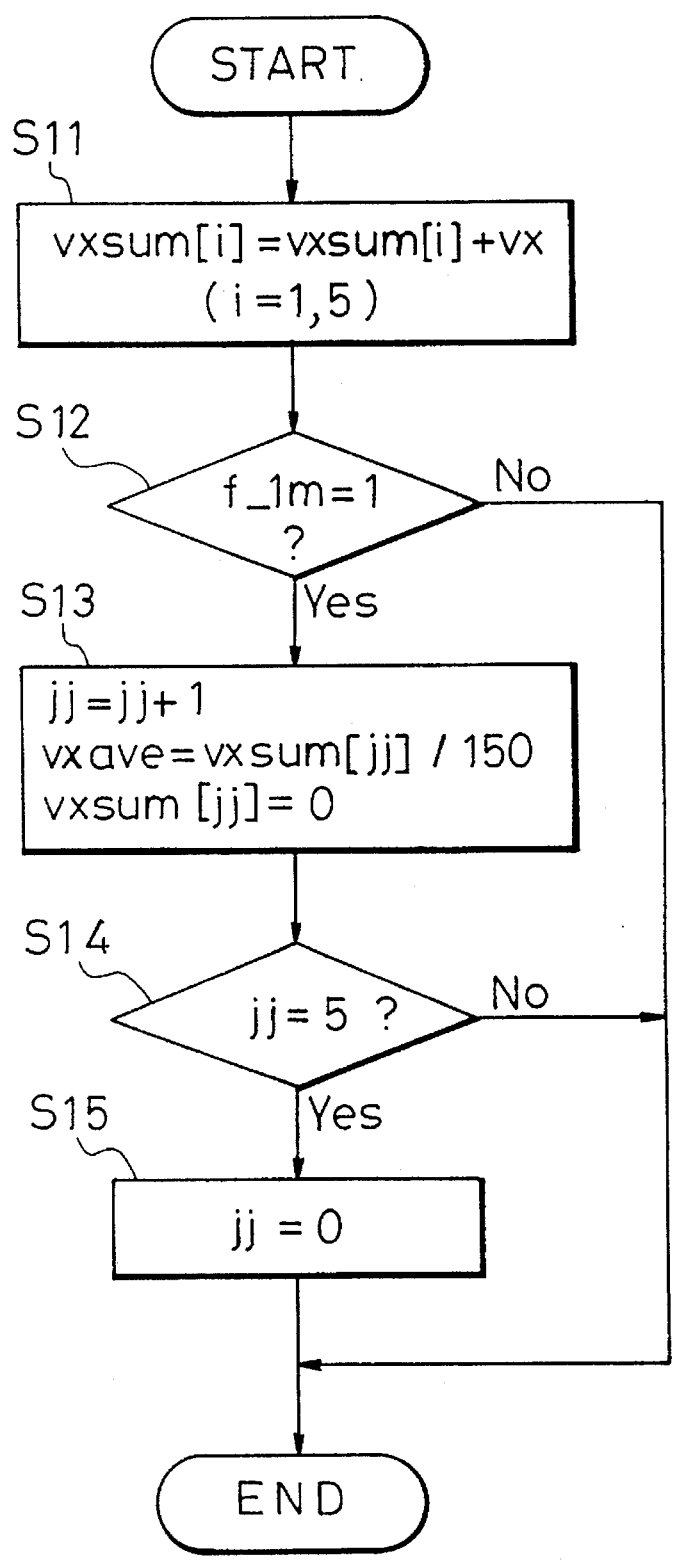
FIG. 5 is a flowchart showing an average speed calculating routine executed by the controller.

The processor of the controller 15 repeatedly executes an average speed calculating routine shown in FIG. 5 at intervals of two seconds, for instance.

In each routine executing cycle, the processor reads vehicle speed data "vx" from the vehicle speed sensor 26, and adds the vehicle speed "vx" to each of stored value vxsum[i] (i=1 to 5) of five cumulative speed registers incorporated in the controller 15 (step S11). Then, the processor determines whether the value of a flag f_1m is "1," which indicates that average speed calculating timing is reached (step S12). The flag f_1m takes a value "1" at 1-minute cycle. If the determination result in the step S12 is negative, then the processing in the present cycle is terminated.

If the determination result in the step S12 becomes affirmative in 1 minute since the routine was started, "1" is added to an index "jj" to update the index "jj," an average speed "vxave" is calculated by dividing a cumulative speed register value vxsum[jj], which corresponds to the updated index "jj," by "150," and the register value vxsum[jj] is reset to "0" (step S13). Next, a determination is made as to whether the updated index "jj" is "5" (step S14). If the determination result is negative, then the processing in the present cycle is terminated.

After that, the index "jj" is updated every 1 minute, and the average speed "vxave" is determined from the cumulative speed register value vxsum[jj] corresponding to the updated index "jj." Further, the index "jj" is reset to "0" every 5 minutes (step S15).

Thus, the actual vehicle speed "vx" is added to each of the five cumulative speed register values vxsum[i] every 2 seconds, and the average speed "vxave" is calculated every minute according to the stored value vxsum[jj] of a corresponding one of the five cumulative speed registers, the stored value showing a total of vehicle speeds detected 150 times (for 5 minutes).

"Average lateral acceleration calculating routine"

Figure 6:
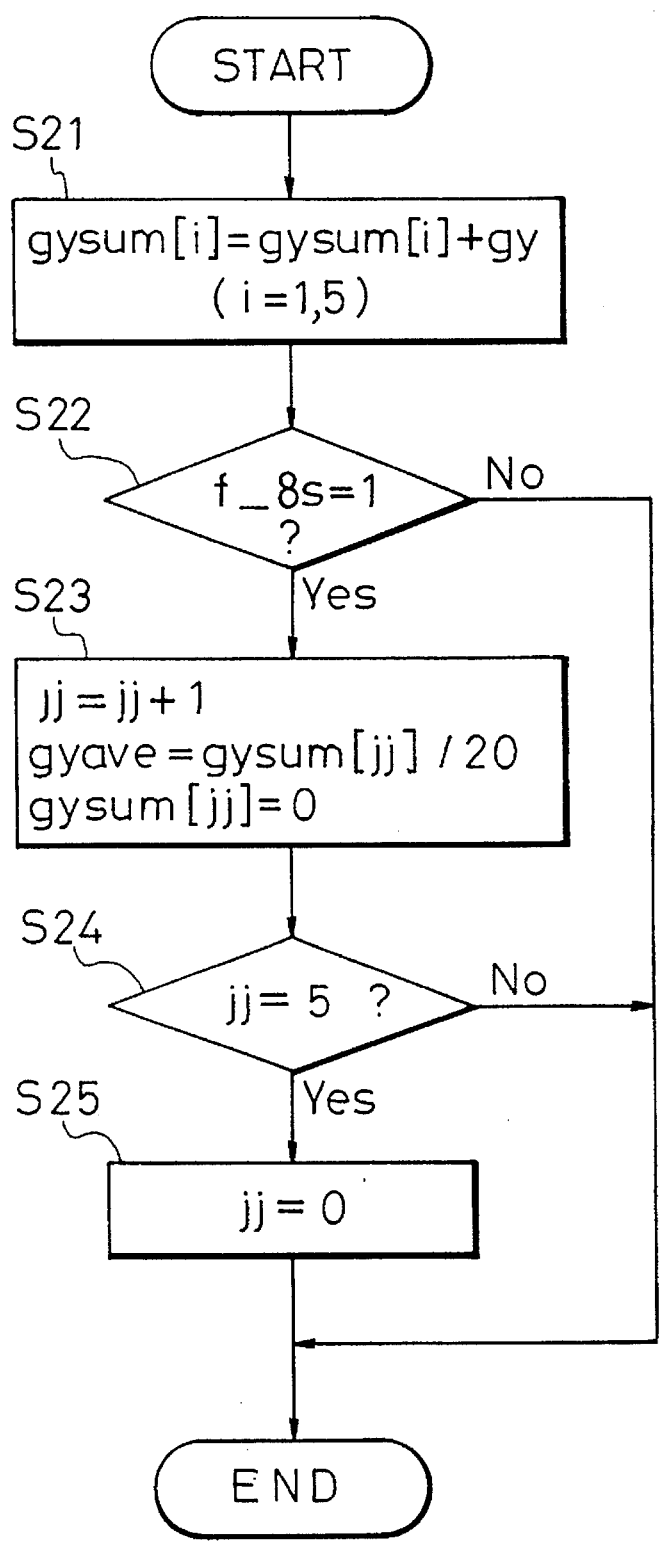
FIG. 6 is a flowchart showing an average lateral acceleration calculating routine executed by the controller.

The processor of the controller 15 repeatedly executes an average lateral acceleration calculating routine shown in FIG. 6 at intervals of 2 seconds, for example.

In each routine executing cycle, the processor reads an output signal of the vehicle speed sensor 26 indicative of a vehicle speed "vx," and an output signal of the steering wheel angle sensor 16 indicative of a steering wheel angle "steera," and determines a predetermined steering wheel angle "gygain," which gives 1 (G) lateral acceleration and which is represented as the function of the vehicle speed "vx," according to the vehicle speed "vx" by referring to a map (not shown). Then, the processor calculates a lateral acceleration "gy" by dividing the steering wheel angle "steera" by the predetermined steering wheel angle "gygain," and adds the lateral acceleration "gy" to a stored value gysum[i] (i=1 to 5) of each of the five cumulative lateral acceleration registers incorporated in the controller 15 (step S21). The processor then determines whether the value of a flag f_8s is "1" which indicates that average lateral acceleration calculating timing is reached (step S22). This flag f_8s takes the value "1" at 8-second intervals. If the determination result in the step S22 is negative, then the processing in the present cycle is terminated.

If the determination result in the step S22 becomes affirmative in 8 seconds since the routine was started, "1" is added to the index "jj" to update the index "jj," an average lateral acceleration "gyave" is calculated by dividing a cumulative lateral acceleration register value gysum[jj], which corresponds to the updated index "jj," by "20," and the register value gysum[jj] is reset to "0" (step S23). Next, a determination is made as to whether the updated index "jj" is "5" (step S24). If the determination result is negative, then the processing in the present cycle is terminated.

After that, the index "jj" is updated every 8 seconds, and the average lateral acceleration "gyave" is determined from the cumulative lateral acceleration register value gysum[jj] corresponding to the updated index "jj." Further, the index "jj" is reset to "0" every 40 seconds (step S25).

Thus, the calculated lateral acceleration "gy" is added to each of the five cumulative lateral acceleration register values gysum[i] every 2 seconds, and the average lateral acceleration "gyave" is calculated every 8 seconds according to the stored value gysum[jj] of a corresponding one of the five cumulative lateral acceleration registers, the stored value showing a total lateral accelerations calculated 20 times (for 40 seconds). "City area degree/road jam degree/mountainous road degree calculating routine"

In the present embodiment, a city area traveling mode, a jammed road traveling mode, and a mountainous road traveling mode, as vehicle traveling modes associated with estimation of a vehicle maneuvering state given by a driver, are selected as objects to be determined. In this respect, the present embodiment is designed to determine a city area degree, a road jam degree, and a mountainous road degree.

The city area degree and the road jam degree are determined by fuzzy inference. In connection with the fuzzy inference, membership functions (FIG. 7 and FIG. 8) representative of fuzzy subsets in the universe of discourse (carrier set) for the traveling time ratio and the average speed, and nine fuzzy rules shown in Table 1 are set beforehand and stored in the memory of the controller 15.

The setting of the fuzzy rules given in Table 1 is based on the fact that the average speed is low and the traveling time ratio is medium when traveling is made in a city area, and that the average speed is low and the traveling time ratio is low when traveling is made on a jammed road.

TABLE 1

| No. | Traveling Time Ratio | Average Speed | Rate of City Area [r_city] | Rate of Road Jam [r_jam] |
|---|---|---|---|---|
| 1 | S | S | 100 | 100 |
| 2 | S | M | 50 | 100 |
| 3 | S | B | 0 | 100 |
| 4 | M | S | 50 | 100 |
| 5 | M | M | 100 | 25 |
| 6 | M | B | 50 | 0 |
| 7 | B | S | 0 | 100 |
| 8 | B | M | 20 | 0 |
| 9 | B | B | 0 | 0 |

Figure 7:
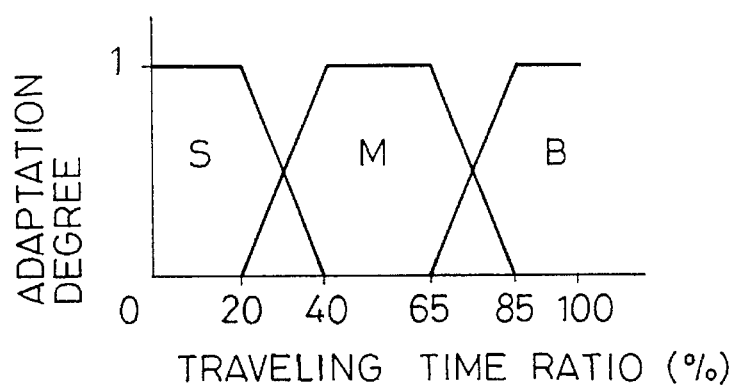
FIG. 7 is a graph indicating membership functions, which define fuzzy sets related to traveling time ratio.

In FIG. 7, symbols S, M, and B are labels representing fuzzy sets in the carrier set related to the traveling time ratio. The membership function which defines the fuzzy set S is determined, so that the conformity degree or adaptation is "1" for a traveling time ratio ranging from 0% to 20%, and the adaptation decreases from "1" to "0" as the traveling time ratio increases from 20% to 40%. Further, the membership function defining the fuzzy set M is established so that the adaptation increases from "0" to "1" as the traveling time ratio increases from 20% to 40%, the adaptation stays at "1" while the traveling time ratio stays within a range of 40% to 65%, and the adaptation decreases from "1" to "0" as the traveling time ratio increases from 65% to 85%. The membership function defining the fuzzy set B is established so that the adaptation increases from "0" to "1" as the traveling time ratio increases from 65% to 85%, and the adaptation stays at "1" when the traveling time ratio is 85% or more.

Figure 8:
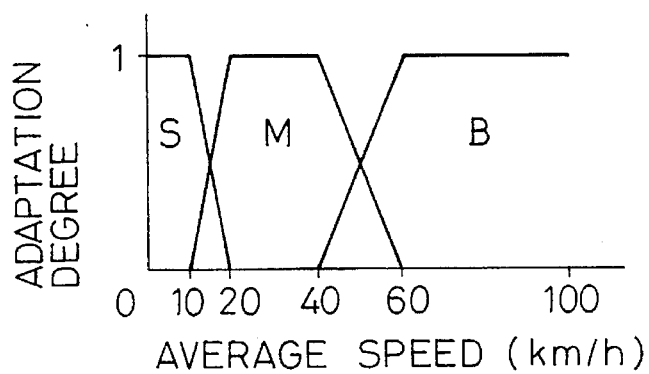
FIG. 8 is a graph indicating membership functions, which define fuzzy sets related to average speed.

Referring to FIG. 8, the membership function defining the fuzzy set S in the carrier set related to the average speed is established so that the adaptation is "1" for the average speed of 0 km/h to 10 km/h, and the adaptation decreases from "1" to "0" as the average speed increases from 10 km/h to 20 km/h. Likewise, the membership function defining the fuzzy set M is established so that the adaptation increases from "0" to "1" as the average speed increases from 10 km/h to 20 km/h, the adaptation is "1" for the average speed of 20 km/h to 40 km/h, and the adaptation decreases from "1" to "0" as the average speed increases from 40 km/h to 60 km/h. The membership function defining the fuzzy set B is established so that the adaptation increases from "0" to "1" as the average speed increases from 40 km/h to 60 km/h, and the adaptation is "1" when the average speed is 60 km/h or more.

The processor of the controller 15 determines an adaptation adap[i] of a combination of the traveling time ratio (%) and the average speed (km/h) to each of the 1st through 9th rules, the traveling time ratio and the average speed being determined according to the calculating routines shown in FIG. 4 and FIG. 5. Then, the processor calculates the city area degree and the road jam degree in accordance with the following calculating formulas:

City area degree [city] = $\Sigma(adap[i] \times r\_city[i]) \div adap[i]$ (i = 1 to 9)

Road jam degree [jam] = $\Sigma(adap[i] \times r\_jam[i]) \div adap[i]$ (i = 1 to 9)

More specifically, the processor determines the adaptation of the actual traveling time ratio to that one of the fuzzy sets S, M, and B related to the traveling time ratio which corresponds to the i'th rule. Then, the processor determines the adaptation of the actual average speed to that one of the fuzzy sets S, M, and B related to the average speed which corresponds to the i'th rule. Of the two adaptations, the smaller one is taken as the adaptation adapt[i] for the combination of the actual traveling time ratio and the actual average speed for the i'th. rule.

Figure 9:
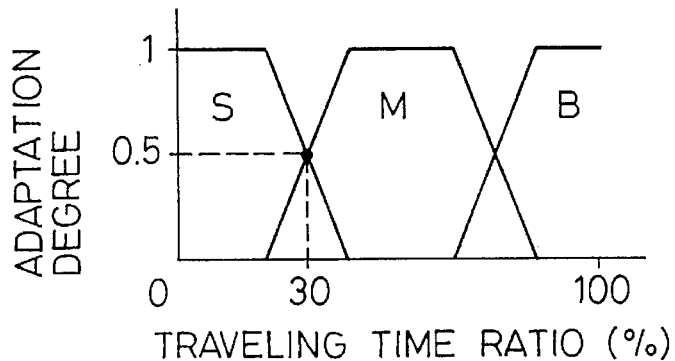
FIG. 9 is a graph showing an example of the calculation of the conformity degree of an actual traveling time ratio to traveling time ratio fuzzy sets concerned.
Figure 10:
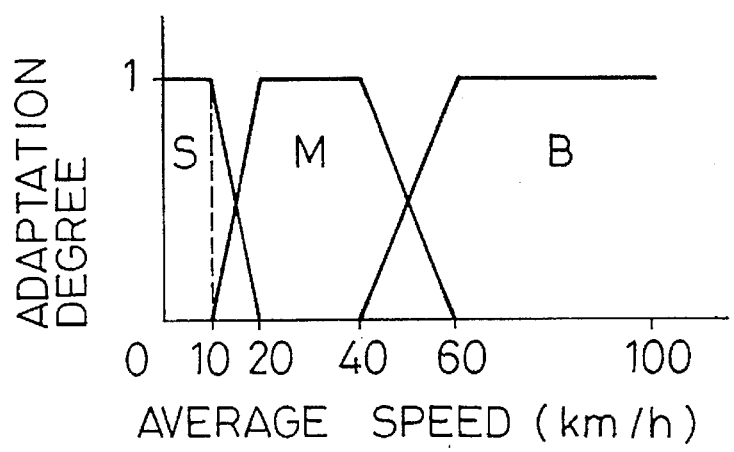
FIG. 10 is a graph showing an example of the calculation of the conformity degree of an actual average speed to an average speed fuzzy set concerned.

With regard to the first rule, as shown in FIGS. 9 and 10, in case that the actual traveling time ratio is 30% and the actual average speed is 10 km/h, a value "0.5" is determined as the adaptation of the actual traveling time ratio 30% to the traveling time ratio fuzzy set S, and a value "1" is determined as the adaptation of the actual average speed 10 km/h to the average speed fuzzy set S. Therefore, the adaptation adapt[1] of a combination of the actual traveling time ratio 30% and the actual average speed 10 km/h, to the first rule, is "0.5."

Figure 11:
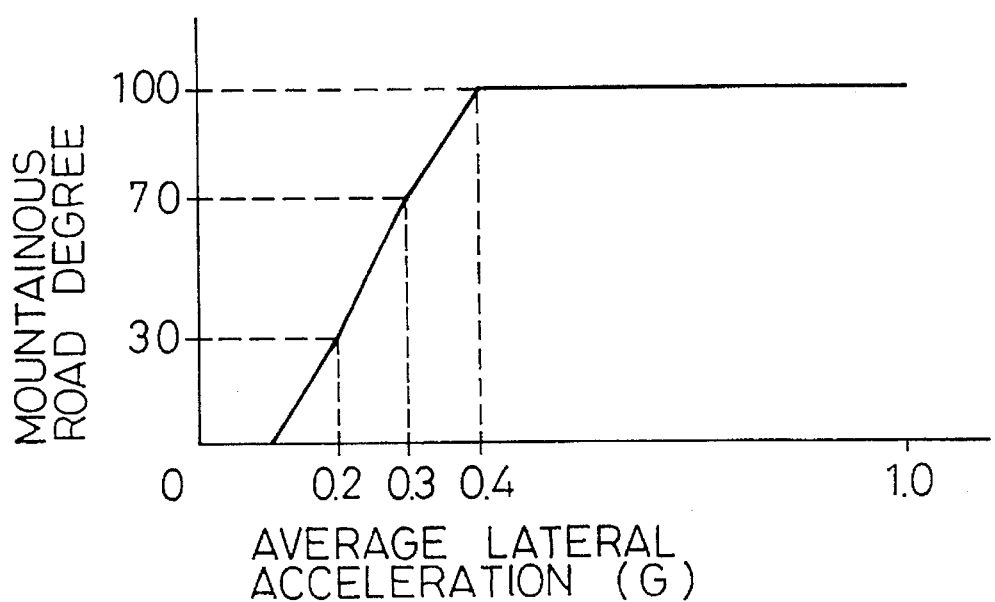
FIG. 11 is a graph illustrating an average lateral acceleration vs. mountainous road degree map.

The processor of the controller 15 then refers an average lateral acceleration vs. mountainous road degree map stored in the memory of the controller 15, and calculates the mountainous road degree in accordance with the average lateral acceleration determined in the routine of FIG. 6. As exemplarily shown in FIG. 11, the map is set so that the mountainous road degree is "0" while the average lateral acceleration ranges from 0 G to about 0.1 G, the mountainous road degree increases from "0" to "100" as the average lateral acceleration increases from about 0.1 G to 0.4 G, and the mountainous road degree becomes "100" when the average lateral acceleration is 0.4 G or more. The map setting is made based on the fact that the integral value of the lateral acceleration increases when traveling is made on a mountainous road.

"Frequency analyzing routine"

Figure 12:
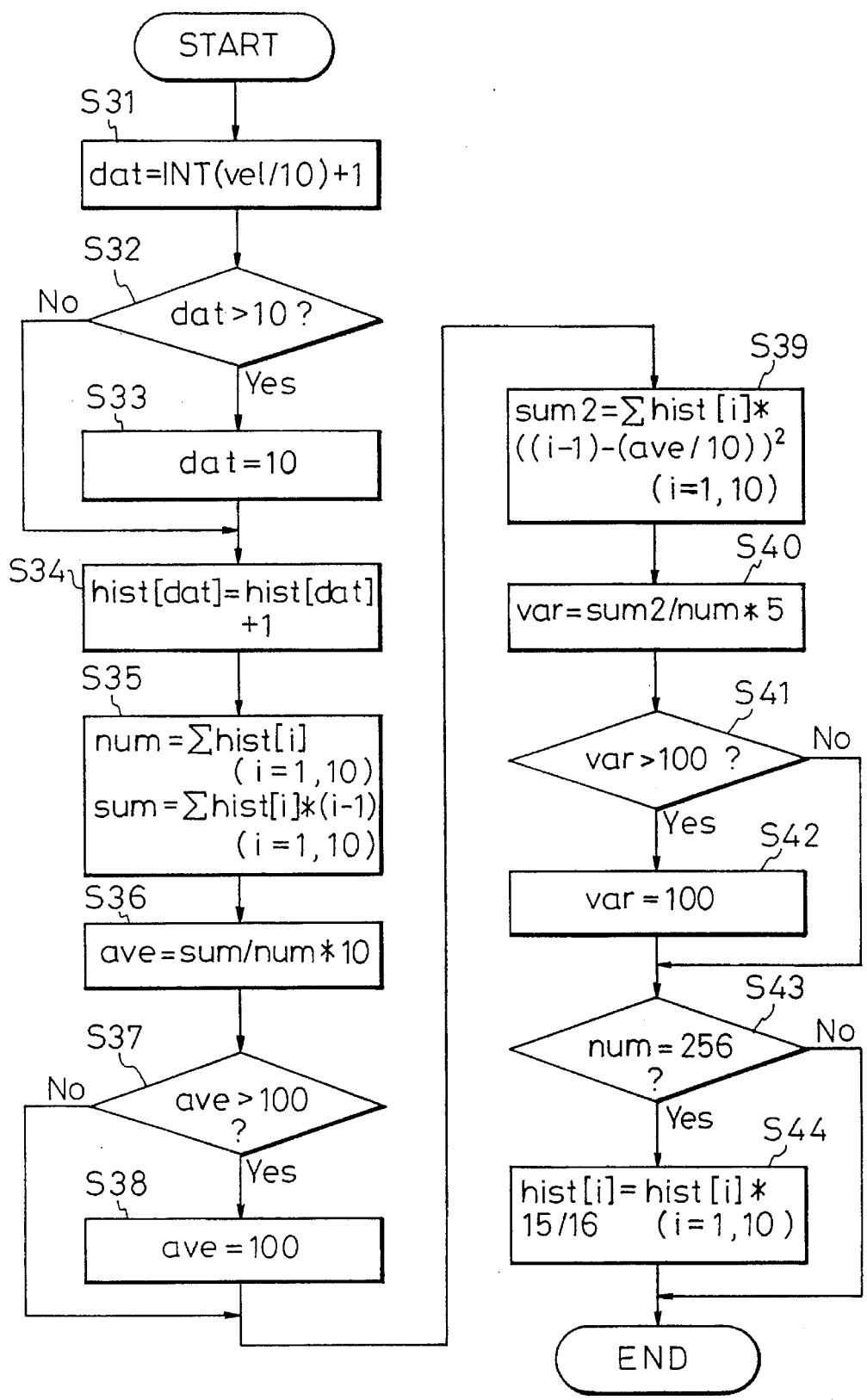
FIG. 12 is a flowchart of a frequency analysis routine implemented by the controller of FIG. 3.

The processor of the controller 15 performs frequency analysis of each of the vehicle speed, longitudinal acceleration, lateral acceleration, and the opening degree of the accelerator at intervals of, for example, 200 ms, to determine the mean values and variances of the respective physical quantities. FIG. 12 shows the frequency analyzing routine for the vehicle speed. The frequency analyzing routines (not shown) for the quantities other than the vehicle speed are configured in the same manner as that of this routine.

The vehicle speed as the frequency analysis parameter is represented by the output signal from the vehicle speed sensor 26, and the input range thereof is set for 0 to 100 km/h, for example.

In accordance with the formula shown below, the opening degree of the accelerator tps(%) is calculated based on the output signal of a throttle opening degree sensor 28, the input range thereof being 0 to 100%.

$tps = (tdata - tpsoff) \div (tpson - tpsoff) \times 100$ where symbol "tdata" indicates the present throttle opening degree sensor output, symbol "tpsoff" indicates the throttle opening degree sensor output when the accelerator is OFF, and symbol "tpson" indicates the throttle opening degree sensor output when the accelerator is fully open.

The processor also samples the output of the vehicle sensor 26 at intervals of 100 ms, for example, and calculates a longitudinal acceleration "gx"(unit: G) according to the formula shown below. The input range of the longitudinal acceleration is, for example, 0 to 0.3 G.

$gx = (vx - vx0) \times 10 \div (3.6 \times 9.8)$ where the symbol "vx" indicates the present vehicle speed (km/h), and symbol "vxO" indicates the vehicle speed (km/h) 100 ms ago.

The processor further reads the output signal from the vehicle sensor 26 representative of the vehicle speed "vx," and the output signal from the steering wheel angle sensor 16 representative of the steering wheel angle "steera." Next, the processor refers to a map, not shown, to determine a predetermined steering wheel angle "gygain," which is represented as the function of the vehicle speed "vx" and which gives the lateral acceleration of 1 (G), according to the vehicle speed "vx." Then, the processor calculates the lateral acceleration "gy" (G) by dividing the steering wheel angle "steera" by the predetermined steering wheel angle "gygain," as shown in the formula shown below. The input range of the lateral acceleration is 0 to 0.5 G, for example.

$gy = steera \div gygain$

Figure 13:
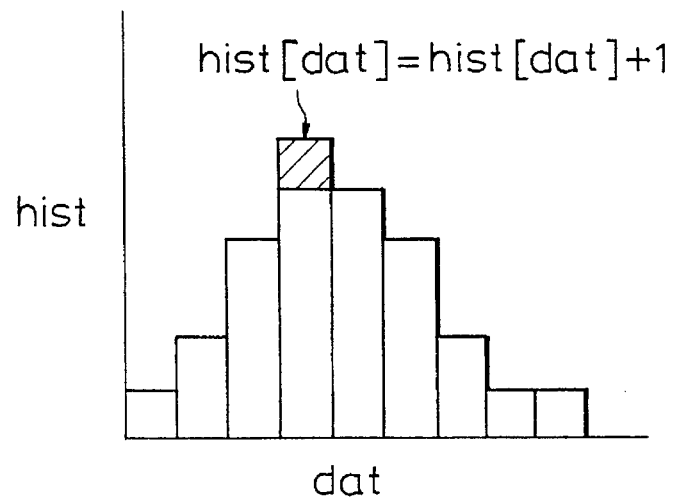
FIG. 13 is a graph showing an array constituting a population of input data subject to frequency analysis.

Referring to FIG. 12, the processor determines a value "dat" by adding "1" to a value (vel/10), which is obtained by dividing the vehicle speed signal "vel," as the frequency analysis parameter (input data), into ten equal parts in the input range of 0 to 100 km/h (step S31). Further, the processor determines whether the value "dat" is larger than "10" (step S32). If the determination result is affirmative, then the processor resets the value "dat" to "10" in a step S33 before it moves to a step S34. On the other hand, if the determination result in the step S32 is negative, then the processor immediately moves from the step S32 to the step S34. In the step S34, as shown in FIG. 13, "1" is added to an element number hist[dat] of a corresponding one of ten arrays, which constitute the population of the input data (the element number of the array on the maximum value side is 0 in FIG. 13).

In the next step S35, the processor determines the total sum "num" of the element numbers of the first through tenth arrays, and also determines the total sum "sum" of the products of the element number and a value "i−1" which has been determined in relation to each array (i'th array). The processor divides the total sum "sum" of the products by the total sum "num" of the element numbers, and further divides the result by a value "10" to determine the mean value "ave" of the input data (the vehicle speed in this case) (step S36).

The processor then determines whether or not the mean value "ave" is larger than "100" (step S37). If the determination result is affirmative, then it resets the mean value "ave" to "100" in a step S38 before it proceeds to a step S39. On the other hand, if the determination result in the step S37 is negative, then the processor immediately moves from the step S37 to the step S39. In other words, the mean value "ave" of the input data is limited to a value of up to "100."

In the step S39, the processor determines, for each array, the product of the array element number hist[i] and a squared value of ((i−1)−(ave/10)), which is obtained by subtracting a value, obtained by dividing the mean value "ave" by "10," from a value "i−1." Next, it calculates a total sum "sum2" of the products. The processor then divides a value, which has been obtained by dividing the total sum "sum2" by the total sum "num" of the element numbers, by a value "5" to calculate a variance "vat" of the input data (step S40). Then, the processor determines whether the variance "var" of the input data is larger than "100" (step S41). If the determination result is affirmative, then it resets the variance "var" to "100" in a step S42 before it moves to a step S43, while it directly moves from the step S41 to the step S43 if the determination result in the step S41 is negative. In other words, the value of the variance "var" of the input data is limited to a value of up to "100."

In the step S43, the processor determines whether the total sum "num" of the element numbers is larger than "256." If the determination result is negative, then the processor terminates the processing in the present cycle. On the other hand, if the determination result is affirmative, the processor resets the element number hist[i] of each of the first through tenth arrays to a value, which is obtained by multiplying the element number hist[i] by a value "15/16," (step S44), before it terminates the processing in the present cycle. In other words, the processor decreases the element number of each array by multiplying it by "15/16" if the element number "num" of the population exceeds "256." After that, the processing shown in FIG. 12 is repeated to periodically determine the mean value and variance of the vehicle speed "vel," which are the input data.

The mean values and variances of other input data, i.e., the opening degree of accelerator, the longitudinal acceleration, and lateral acceleration, are determined in the same manner.

As the driver increases its driving sportiness, the mean values and variances of the respective input data increase. The mean value of the vehicle speed, however, is greatly dependent on the road traffic condition.

"Vehicle maneuvering state calculating routine"

The processor of the controller 15 determines, through its neural network function, the a vehicle maneuvering state given or intended by the driver. In this embodiment, the city area degree, the road jam degree, and the mountainous road degree, which have been determined by the aforesaid fuzzy inference, are supplied to a neural network, in addition to the mean values and variances of the vehicle speed, accelerator opening degree, longitudinal acceleration, and lateral acceleration, which have been determined from the aforesaid frequency analysis, so as to determine the driver's driving sportiness, as the vehicle maneuvering state given by the driver.

Figure 14:
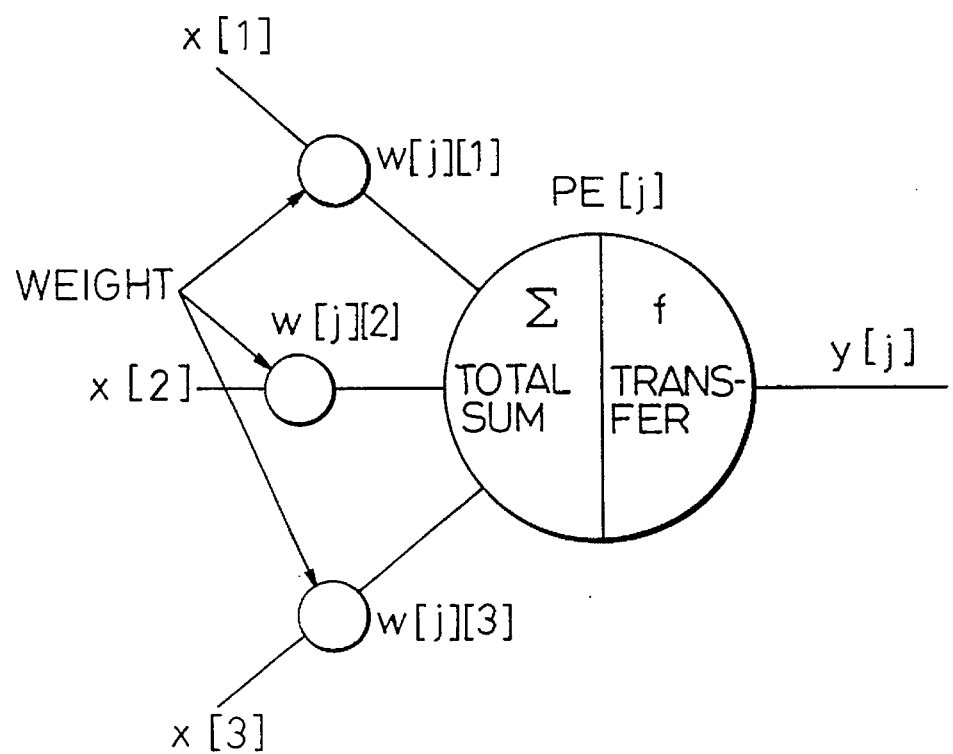
FIG. 14 is a conceptual diagram showing processing elements making up a neural network.
Figure 15:
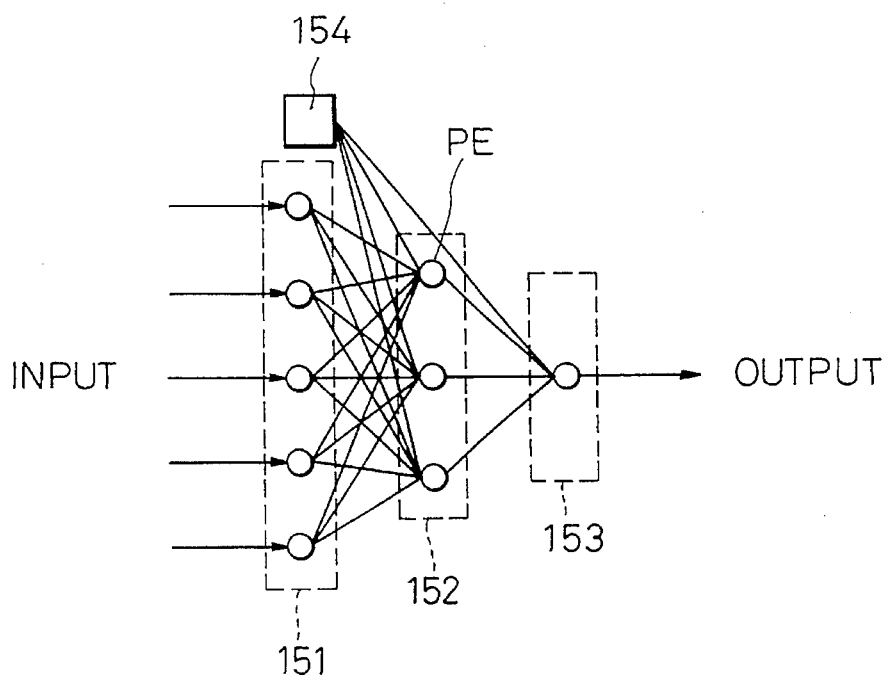
FIG. 15 is a conceptual diagram of the neural network comprised of the processing elements shown in FIG. 14.

Conceptually, the neural network is made up of processing elements (PE) shown in FIG. 14, which are interconnected in a complicated manner as illustrated in FIG. 15. Each PE receives the total sum of many inputs x[i] each multiplied by the weight w[j] [i] of each of the inputs. In each PE, the total sum is converted by a certain transfer function "f," and a resulting output y[i] is sent out from the PE.

With reference to FIGS. 14 and 15, the neural network used in this embodiment has a hidden layer 152 located between an input layer 151 and an output layer 153. The input layer 151 is comprised of eleven PEs, the hidden layer 152 is comprised of six PEs, and the output layer 153 is comprised of one PE. The transfer function "f" of PE is defined by f(x)=x. The weight w[j] [i] in the coupling between the PEs is decided in the course of a learning process. The neural network of the present embodiment has an additional input 154 called a bias.

In this embodiment, the function of the neural network is accomplished by the controller 15.

Figure 16:
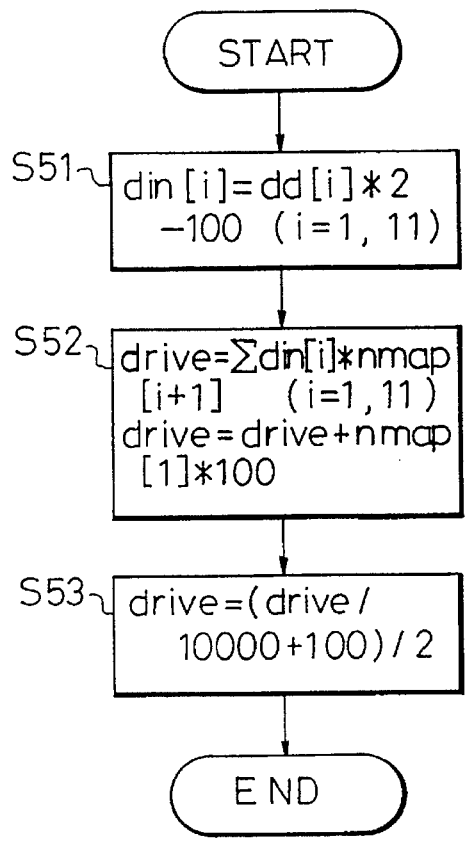
FIG. 16 is a flowchart showing a sportiness calculating routine executed by the controller of FIG. 3.

In order to implement the neural network function, the processor of the controller 15 periodically carries out a sportiness calculating routine shown in FIG. 16, with use of, as the input data, the respective mean values and variances of the vehicle speed, accelerator opening degree, longitudinal acceleration, and lateral acceleration, together with city area degree, road jam degree, and mountainous road degree (all of them having the output range of 0 to 100).

In the routine shown in FIG. 16, the processor subtracts "100" from the product of input data dd[i] and "2," to convert the range for eleven input data dd[i] (i=1 through 11) from "0 to 100" to "−100 to 100," thereby obtaining input data din[i], which have undergone the range conversion (step S51).

The processor then determines a total sum "drive" of the products of the pieces of input data din[i] and weight coefficients nmap[i+1], which have been determined for each input data din[i] having undergone the range conversion. Further, the processor determines a similar product (nmap[1] ***100) on the bias. The processor further adds the product (nmap[1] ***100) related to the bias to the total sum "drive" related to the input data, thus determining the output "drive" representing the sportiness (step S52).

The processor adds "100" to the sportiness output "drive," which has been divided by "10000," divides the result of the addition by "2," and converts the sportiness output range from "−1000000 to 1000000" to "0 to 100" (step S53), thus terminating the calculation of the sportiness in one calculation cycle.

In the above-mentioned manner, the output "drive" representative of the driver's sportiness, as the vehicle maneuvering state, is determined. According to test driving results, the estimated value of the driver's sportiness indicated by the output "drive" well coincided with the sportiness evaluated and reported by the test driver himself. This is interpreted that the vehicle maneuvering state given or intended by the driver, which is difficult to evaluate by physical quantities such as vehicle speed, was evaluated on the basis of the mean values and variances of the physical quantities by which the frequency distributions of the respective physical quantities are characterized, and that the road traffic condition was taken into account in the evaluation of the vehicle maneuvering state.

The following describes a vehicle running characteristic control method according to a second embodiment of the present invention.

This embodiment is intended to control the vehicle running characteristic to adapt it to the road traffic condition estimated, e.g., by the estimating method of the first embodiment described above. The procedure for estimating the road traffic condition is identical to that of the aforesaid estimating method; therefore, the explanation of the equipment configuration for that purpose will be omitted.

In this embodiment, the description is given to a motorcar provided with a 4-wheel steering system as the apparatus for variably controlling the vehicle running characteristics.

Figure 17:
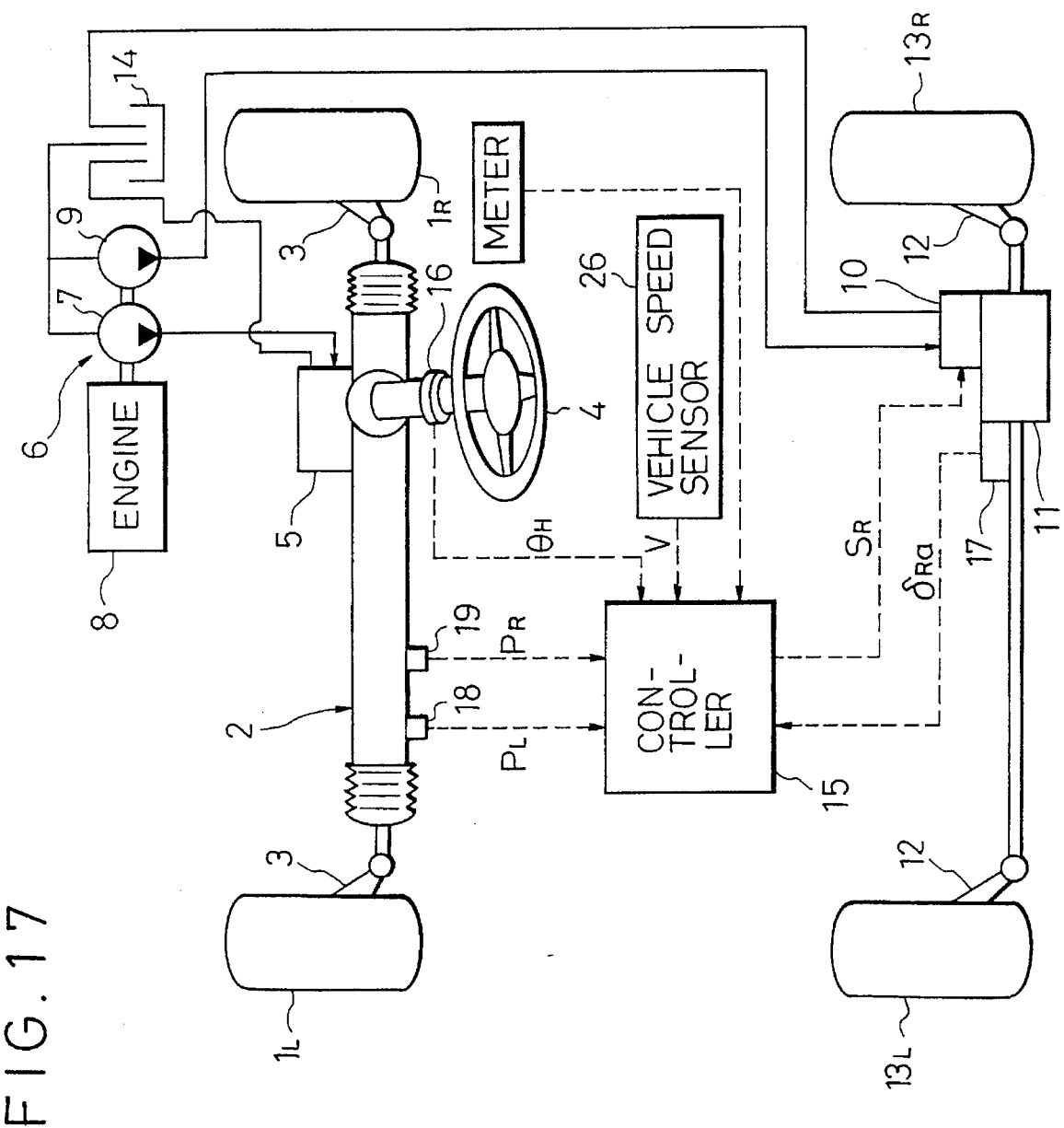
FIG. 17 is a schematic diagram showing a major section of a four-wheel steering system mounted on a vehicle, to which a vehicle running characteristic control method according to a second embodiment of the present invention is applied.

Referring to FIG. 17, the right and left front wheels 1L, 1R of the motorcar are coupled to a front-wheel power steering system 2 via tie rods 3. This system 2, which constitutes the 4-wheel steering system in cooperation with various elements to be discussed later, includes a rack and pinion mechanism (not shown) operated by a steering wheel 4, and a front-wheel steering actuator (not shown) coupled to the rack and pinion mechanism and having a hydraulic cylinder.

The front-wheel steering actuator is connected to one hydraulic pump 7 of a pump unit 6 via a front-wheel steering valve 5 operated by the steering wheel 4. The pump unit 6 is of a double pump type driven by an engine 8, and the other hydraulic pump 9 is connected to a rear-wheel steering actuator 11 via a rear-wheel steering valve 10.

The rear-wheel actuator 11, which is also comprised of a hydraulic cylinder, has a piston rod thereof linked to the right and left rear wheels 13L, 13R via tie rods 12. In FIG. 17, reference numeral 14 denotes a reservoir tank.

The front-wheel steering actuator is operated in accordance with the steering direction by the hydraulic oil supplied from the hydraulic pump 7 via the front-wheel steering valve 5 at the time when the steering wheel 4 is operated, while the operation of the rear-wheel steering actuator 11 is controlled by a controller 15. More specifically, when the steering wheel 4 is operated, the controller 15 supplies an operation control signal SR suited to the vehicle traveling state to the rear-wheel steering valve 10, thereby controlling the hydraulic oil supplied from the hydraulic pump 9 to the rear-wheel steering actuator 11 via the valve 10.

In relation to the control of the operation of the rear-wheel steering actuator discussed above, the controller 15 is electrically connected to diverse sensors and meters. Specifically, supplied to the controller 15 are the vehicle speed V (corresponding to the aforesaid vehicle speed signal "vx") from the meter concerned, sensor signals indicative of operating states of various devices, sensor signals indicative of steering wheel angle θH (corresponding to the aforesaid steering wheel angle "steera") from a steering wheel angle sensor 16, and a sensor signal indicative of the power steering pressure (the working pressure of the power steering system 2 and the front-wheel steering actuator). In this embodiment, the difference between pressures PL, PR of the right and left pressure chambers (not shown) of the front-wheel steering actuator, which are detected by a pair of pressure sensors 18, 19, is determined as the power steering pressure.

Figure 18:
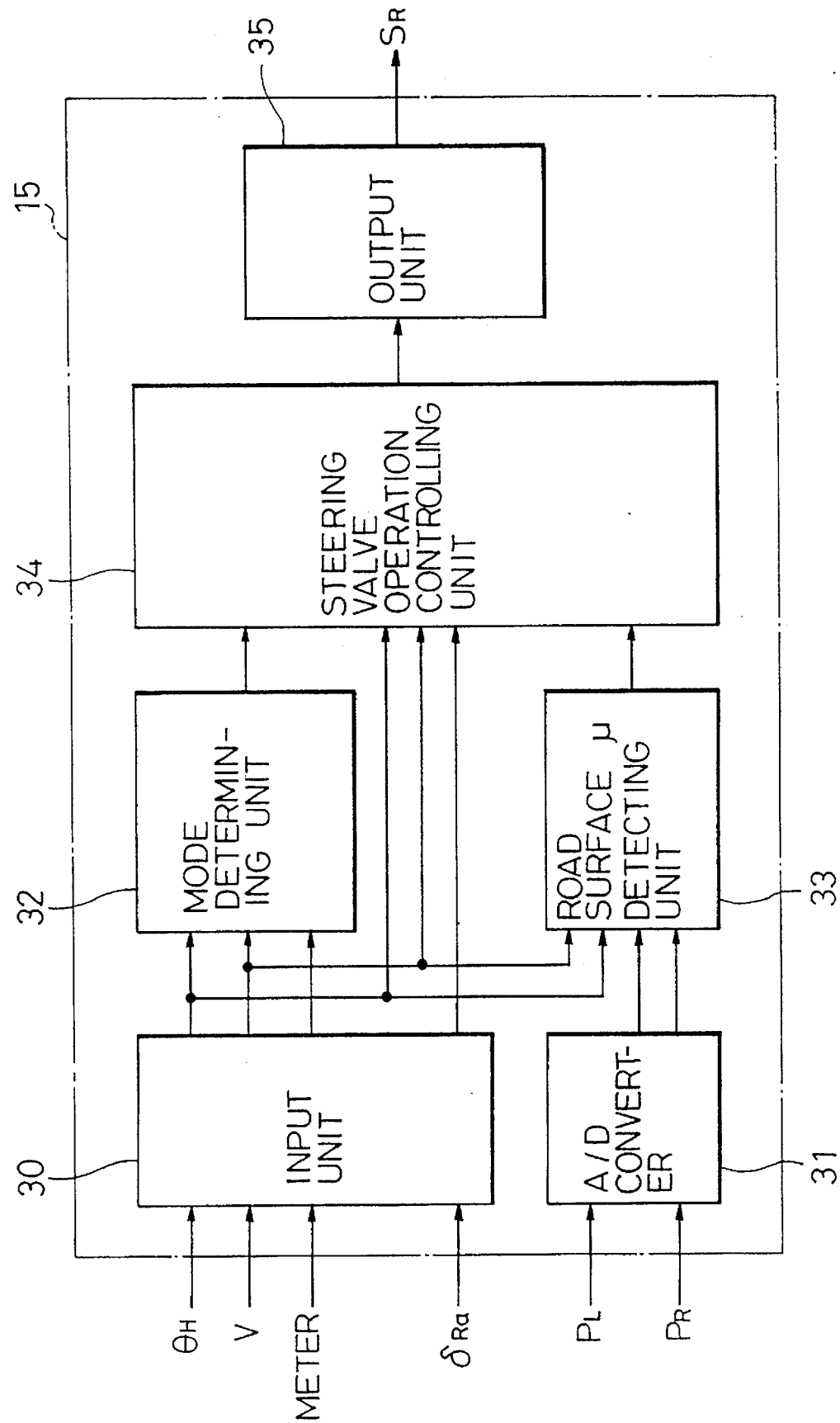
FIG. 18 is a functional block diagram showing the configuration of the controller of FIG. 17, which configuration is related to a four-wheel steering function.

As shown in FIG. 18, functionally, the controller 15 is provided with an input unit 30 for receiving data from the steering wheel angle sensor 16, a vehicle speed sensor 26, the meter and the rear-wheel steering angle sensor 17; an A/D converter 31 for receiving signals from the pressure sensors 18, 19; a mode determining unit 32 for determining the traveling mode of the vehicle in accordance with the data supplied from the input unit 30; and a road surface μ detecting unit 33 for computing a road surface friction coefficient, i.e., the road surface μ, in accordance with the data received from the input unit 30 and the A/D converter 31. The controller 15 is further provided with a steering valve operation controlling unit 34 for calculating an operation control signal SR for the rear-wheel steering valve 10 in accordance with the data received from the input unit 30, the mode determining unit 32, and the road surface μ detecting unit 33; and an output unit 35 for outputting the operation control signal SR, calculated by the controlling unit 34, to the rear-wheel steering valve 10.

The mode determining unit 32 has a function to select the steering mode of the rear wheels (e.g., stop of the control, large steering angle control of the rear wheels or phase control of the rear wheels) in accordance with the steering wheel angle θH, the vehicle speed V, and the data supplied to the input unit 30 from the meter. The road surface μ detecting unit 33 has a function to detect the road surface μ from the steering wheel angle θH, the vehicle speed V, and the pressures PL, PR.

Figure 19:
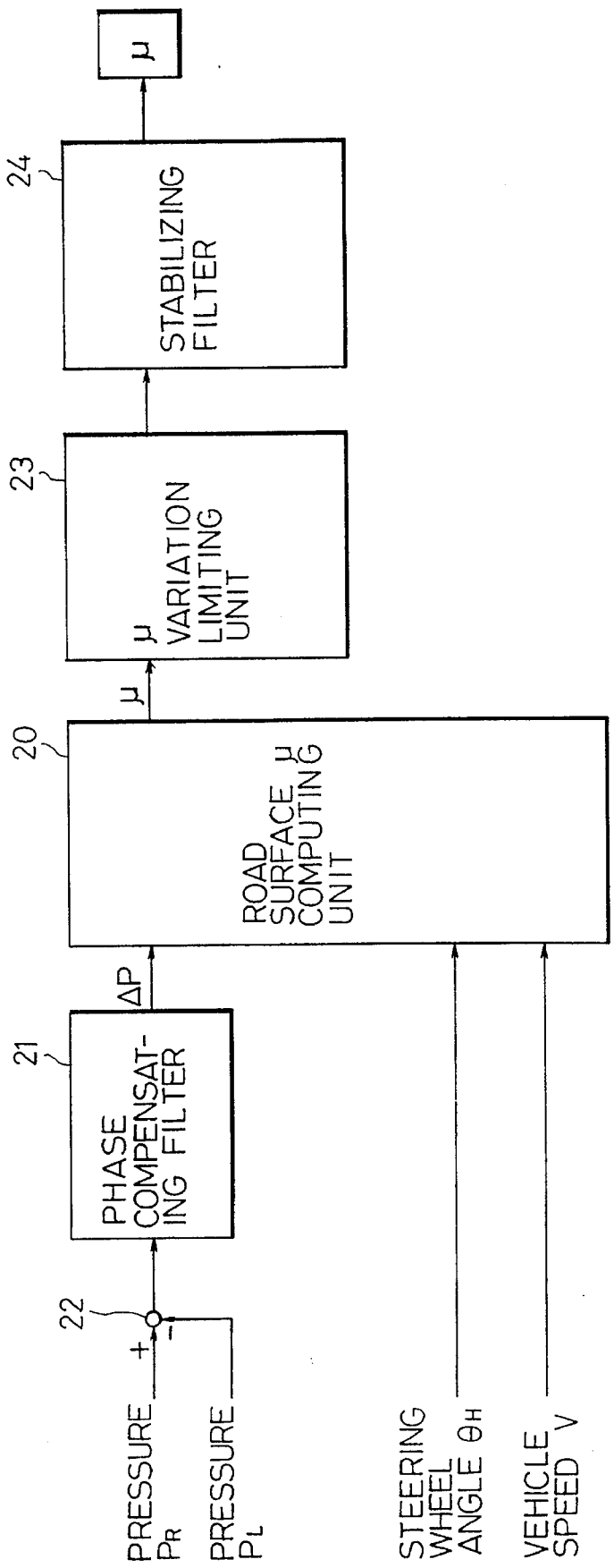
FIG. 19 is a functional block diagram showing, in detail, the configuration of a road surface $\mu$ detecting unit of FIG. 18.

As shown in FIG. 19, the road surface μ detecting unit 33 is equipped with a subtracting unit 22 for calculating the difference between the pressures PL and PR from the pressure sensors 18 and 19, as a power steering pressure ΔP. The power steering pressure ΔP from the subtracting unit 22 goes through a phase compensating filter 21 to eliminate noises and to compensate the advance of the phase of the power steering pressure ΔP with respect to the steering wheel angle θH during a steering transition period of the steering wheel 4 before it is supplied to the road surface μ computing unit 20. Supplied to the computing unit 20 are the steering wheel angle θH detected by the steering wheel angle sensor 16 and the vehicle speed V detected by the vehicle speed sensor 26. The road surface μ computing unit 20 calculates the road surface μ from the power steering pressure ΔP, the steering wheel angle θH, and the vehicle speed V according to the formula shown below:

$$P/\theta H = \mu \cdot C1 \cdot V2/(\mu + C2 \cdot V2)$$

where C1 and C2 denote constants.

Although a detailed explanation will be omitted, the formula shown above is derived from the fact that the power steering pressure ΔP, which is nearly proportional to cornering force, is proportional to the product of a side skid angle and the road surface μ, and that the side skid angle is represented as a function of the vehicle speed V, the steering wheel angle θH, and the road surface μ.

The road surface μ calculated by the road surface μ computing unit 20 is sent out from a μ variation limiter 23 to a stabilizing filter 24 when the changing rate thereof stays within a predetermined range, and the value of the road surface μ is stabilized by the filter 24.

The operation of the controller 15 serving as the road surface μ detecting unit 33 will now be briefly described.

The pressures PL, PR, the steering wheel angle θH, and the vehicle speed V detected by the pressure sensors, 18, 19, the steering wheel angle sensor 16, and the vehicle speed sensor 26 (meter), respectively, are read into the controller 15.

Then, the power steering pressure ΔP (=PR−PL) is calculated, and the result is subjected to filtering to eliminate the phase advance of the power steering pressure ΔP in the steering transition period of the steering wheel 4. Next, a determination is made as to whether the steering wheel 4 is being turned or unturned according to the magnitude of the steering wheel angle θH and the changing trend thereof. If the steering wheel 4 is being turned, then it is further determined whether or not the absolute value of the steering wheel angle θH is a predetermined value θ1 (e.g., 10°) or more. If the steering wheel 4 has been kept unturned or if the steering wheel angle θH has not reached the predetermined value v1, then the procedure following the reading of the sensor outputs is repeated. If the steering wheel θH is the predetermined value θ1 or more and the power steering pressure ΔP has been substantially risen, then the ratio (ΔP/θH) of the power steering pressure ΔP to the steering wheel angle θH is determined.

Next, it is determined whether the sign of ΔP/θH is positive or not, in order to determine whether the direction of the power steering pressure ΔP is identical to that of the steering wheel angle θH so as to accurately calculate the road surface μ by eliminating influences exerted by the inertia of the front wheels and the like. If the determination result is negative, then it is determined that phase inversion has taken place between the power steering pressure ΔP and the steering wheel angle θH due to the filtering, and the procedure following the reading of the sensor outputs is repeated. On the other hand, if the sign of ΔP/θH is positive, then a coefficient Kμ represented by the formula below is read out from a map stored in a memory (not shown) of the road surface μ computing unit 20.

$$K\mu = 1 + C2 \cdot V2/(C1 \cdot V2)$$

Then, the road surface μ is calculated by multiplying the coefficient Kμ by a value ΔP/θH. Further, a determination is made as to whether a changing rate (differential value) dμ/dt of the computed road surface μ is a predetermined value Δμ(e.g., 0.2 μ/sec) or less. If the determination result is negative, then the procedure following the reading of the sensor outputs is executed. On the other hand, if the determination result is positive, then the filtering for stabilizing the value of the road surface μ is carried out, to prevent a sudden change in the road surface μ before the road surface μ is supplied to the steering valve operation controlling unit 34.

The steering valve operation controlling unit 34 calculates the rear-wheel steering valve operation controlling signal SR in accordance with the output data received from the mode determining unit 32 and the road surface μ detecting unit 33; if the rear-wheel phase control is selected by the mode determining unit 32, then the controlling unit 34 computes the rear-wheel steering angle δR in accordance with the following conventionally known computation formula based on the steering wheel angle θH, etc.

$$\delta R = K1 \cdot \delta F - K2 \cdot (d\delta F/dt)$$

where symbols K1, K2, δF, and dδF/dt indicate the in-phase coefficient, antiphase coefficient, front-wheel steering angle, and the steering angular velocity of the front wheels, respectively.

Figure 20:
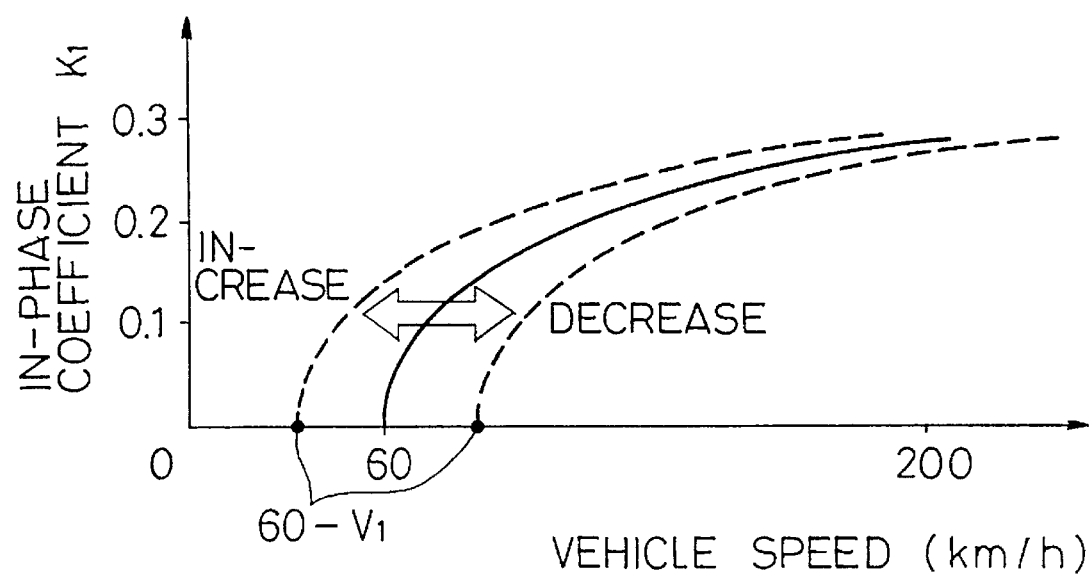
FIG. 20 is a map showing a relationship between vehicle speed and in-phase coefficient.

The controller 15 calculates the in-phase coefficient K1 corresponding to the vehicle speed V in accordance with the map, which corresponds to the vehicle speed vs. in-phase coefficient characteristic shown by the solid line in FIG. 20 and which is stored in the memory beforehand. The in-phase coefficient K1, which represents the ratio of the rear-wheel steering angle to the front-wheel steering angle, takes a value which increases with an increase in the vehicle speed V in a vehicle speed range of a predetermined vehicle speed V1 (e.g., 60 km/h) or more.

Figure 21:
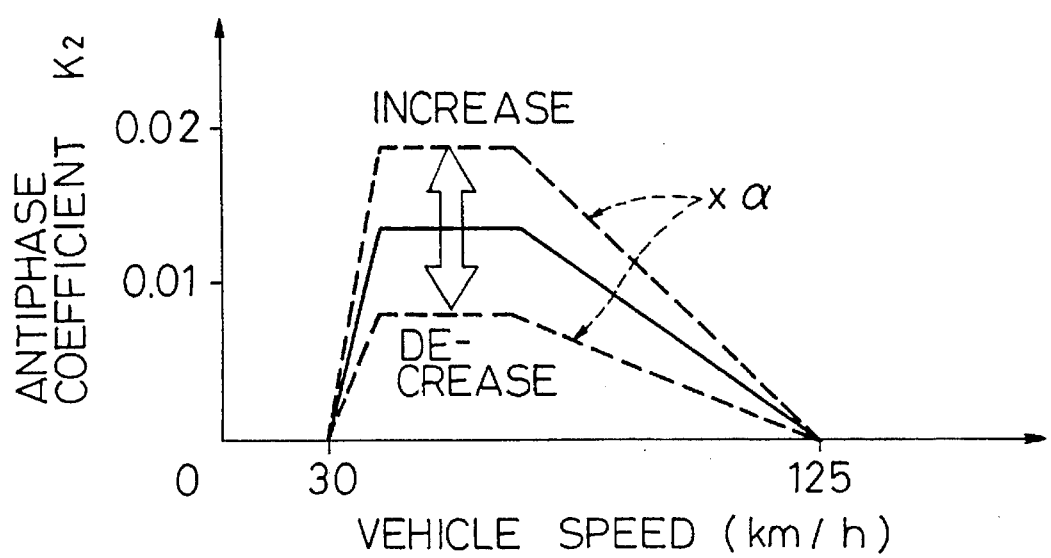
FIG. 21 is a map showing a relationship between vehicle speed and antiphase coefficient.

The controller 15 calculates the antiphase coefficient K2 corresponding to the vehicle speed V in accordance with the map, which corresponds to the vehicle speed vs. antiphase coefficient characteristic indicated by the solid line shown in FIG. 21 and which is stored in the memory beforehand. The antiphase coefficient K2 takes a value, which increases or decreases as the vehicle speed increases in a predetermined vehicle speed range (e.g., a vehicle speed range of 30 km/h to 125 km/h).

A map, exemplarily shown in Table 2, is stored beforehand in the memory of the controller 15. The map has optimum increasing/decreasing speed V1 and increasing/decreasing coefficient α, which have been set to match a road traffic condition (e.g., jammed road) and vehicle maneuvering state (sportiness) given by the driver.

In the map of Table 2, the road traffic condition is classified into four groups, namely, expressway, mountainous road, city road, and jammed road. An suited one of these four traffic conditions is selected as the traffic condition at the present time.

TABLE 2

| Road Traffic Condition | V1 | α |
|---|---|---|
| Mountainous Road | −10 | 1.5 |
| City Area Road | 0 | 1.3 |
| Jammed Road | 0 | 1.0 |

The in-phase coefficient K1 is corrected as shown by the dotted lines of FIG. 20 in accordance with the increasing/decreasing speed V1 read out according to the map of Table 2. More specifically, the in-phase coefficient K1 is corrected so that the coefficient K1 takes a larger value as the increasing/decreasing speed V1 takes a positive value. In other words, the characteristic line of the map is moved so that a rise starting speed "60–V 1" of the in-phase coefficient K1 decreases as the increasing/decreasing coefficient takes a positive value. As a result, the in-phase coefficient K1 matched to the road traffic condition, vehicle maneuvering state, and vehicle speed can be determined.

The antiphase coefficient K2 is corrected as shown by the dotted lines of FIG. 21 in accordance with the increasing/decreasing coefficient a read out according to the map of Table 2. More specifically, the antiphase coefficient K2 is corrected so that the antiphase coefficient K2 takes a larger value as the increasing/decreasing coefficient α takes a value larger than "1." In other words, the characteristic line is multiplied by α and moved accordingly in accordance with the determined increasing/decreasing coefficient α. As a result, an antiphase coefficient K2 suited to the road traffic condition, vehicle maneuvering state, and vehicle speed can be determined.

For instance, if the road traffic condition is determined as being a mountainous road, the increasing/decreasing speed V1 is set to "−10" and the increasing/decreasing coefficient α is set to "1.5." Then, in accordance with the aforementioned formula, the rear-wheel steering angle δR is determined based on these coefficients, the front-wheel steering angle δF and the front-wheel steering angular velocity dδF/dt.

When the rear-wheel steering angle δR has been calculated as described above, the steering valve operation controlling unit 34 sends the operation control signal SR, calculated based on the rear-wheel steering angle δR, to the rear-wheel steering valve 10 via the output unit 35. This causes the valve 10 and the rear-wheel steering actuator 11 to operate so that the actual steering angles of the rear wheels 13L and 13R to coincide with the rear-wheel steering angle δR.

As discussed above, in the 4-wheel steering system of the second embodiment, a determination, based on the maneuvering state (sportiness "drive") obtainable by the aforementioned estimating method, is unnecessary. This eliminates the need of setting the increasing/decreasing speed V1 and the increasing/decreasing coefficient α for each road traffic condition, which vary in dependence on the sportiness, and produces such an advantage that the capacity of the memory of the controller 15 can be reduced.

In this embodiment, the increasing/decreasing speed V1 may be changed when the city area road or jammed road is determined. Further, the increasing/decreasing speed V1 or coefficient α may be variably controlled in accordance with the city area degree or jammed road degree.

The aforesaid 4-wheel steering system is advantageous in that the steering characteristic suited to the road traffic condition can be achieved, to thereby improve the drive feelings at the time of rear-wheel steering.

The following discusses a vehicle running characteristic control method according to a third embodiment of the present invention.

This embodiment and the later-mentioned fourth through fifth embodiments are intended to control the vehicle running characteristic to adapt the same to the road traffic condition and the vehicle maneuvering state (sportiness) estimated by the estimating method of the first embodiment, for example. The procedure for estimating the road traffic condition and the sportiness is identical to that of the estimating method described above; therefore, the explanation on the configuration of the equipment therefor will be omitted.

This embodiment is applied to a motorcar equipped with a power steering unit, which is capable of controlling the steering power of a steering wheel, and which servers as an apparatus for controlling the vehicle running characteristic. In the following description and FIG. 22, the same members as those in the second embodiment are given the same numerals.

Figure 22:
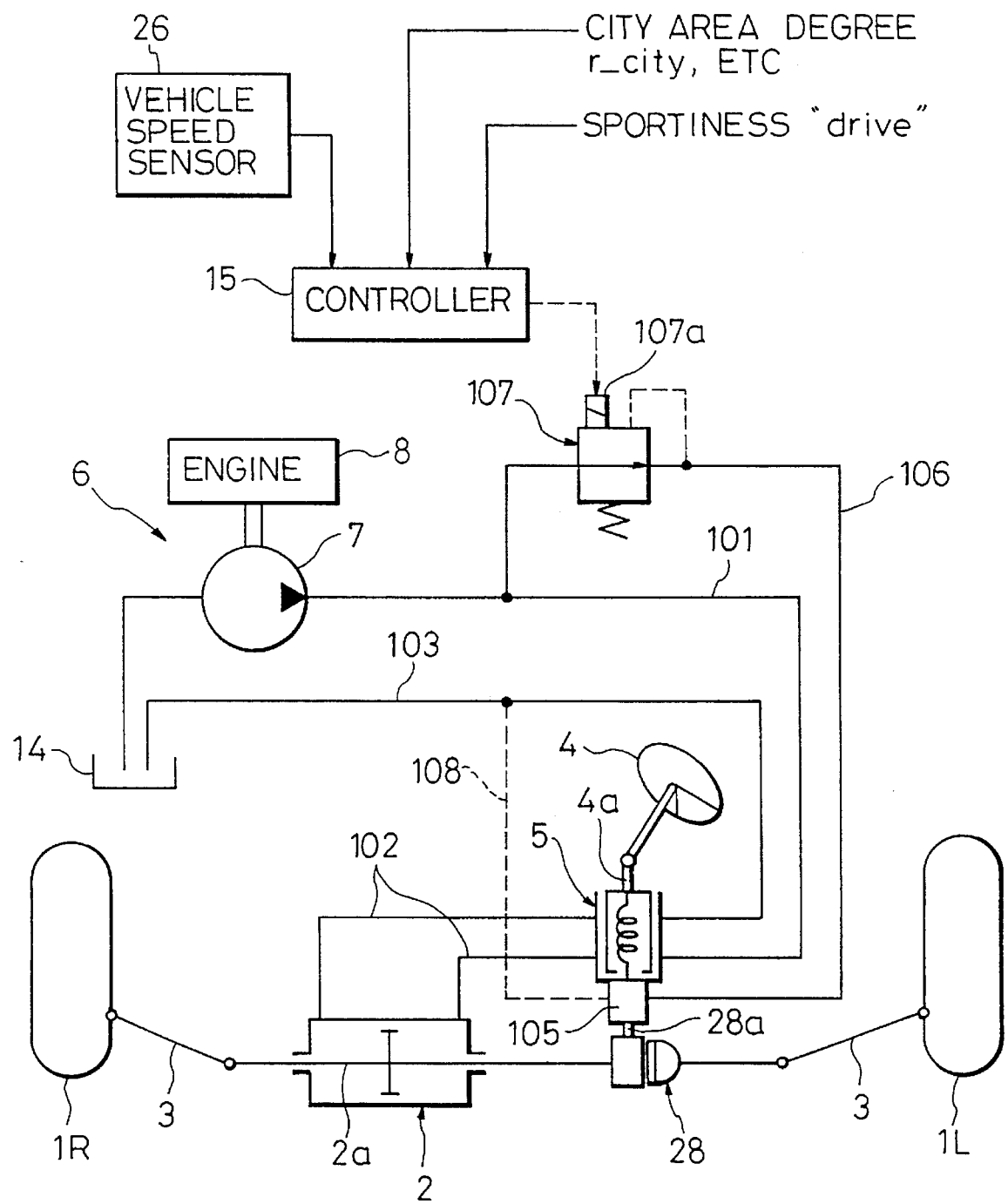
FIG. 22 is a schematic configuration diagram of a power steering unit mounted on a vehicle, to which a vehicle running characteristic control method according to a third embodiment of the present invention is applied.

Referring to FIG. 22, in the power steering unit, a front wheel 1R is coupled to a piston rod 2a in a power cylinder 2 via a knuckle arm 3. Specifically, the power cylinder 2 comprised of a double-rod hydraulic cylinder, and the other piston rod 2a of the power cylinder 2 is coupled to the other front wheel 1L via a knuckle arm 3.

The power cylinder 2 is connected to an oil pressure supply source 6 via a hydraulic circuit. In this case, the oil pressure supply source 6 is equipped with a hydraulic pump 7, which is driven by an engine 8 of the motorcar. The hydraulic pump 7 discharges the hydraulic oil, which has been pumped up from a reservoir tank 14, through a discharging port thereof. The hydraulic circuit has a supply line 101 extending from the discharge port of the hydraulic pump 7, and the downstream side of the supply line 101 from a direction control valve 5 is split into two branch pipes 102. These branch pipes 102 are respectively connected to two pressure chambers of the power cylinder 2.

The direction control valve 5 consists of a 4-port, 3-position directional control valve (actually a rotary valve) with a restrictor; connected to three out of the four ports are the supply line 101 and the branch pipes 102, the remaining port being connected to the reservoir tank 14 via a return pipe 103. Although the switching operation of the directional control valve 5 is not illustrated in detail, it is accomplished by operating the steering wheel 4. The flowing direction of the hydraulic oil supplied from the hydraulic pump 7 to the power cylinder 2 is controlled in accordance with the operating direction of the steering wheel 4. Hence, when the steering wheel 4 is steered, the power cylinder 2 is operated in accordance with the steering direction, thereby aiding the steering power of the steering wheel 4. Specifically, as conventionally known, the piston rod 2a of the power cylinder 2 is actuated by a rack and pinion 104 interlocked with the operation of the steering wheel 4. At this time, the power cylinder 2 is also actuated, thus permitting easy operation of the steering wheel 4. When the steering wheel 4 is not in operation, the direction control valve 5 is in the neutral position, causing the two pressure chambers of the power cylinder 2 to be connected to the lower pressure side, i.e., to the reservoir tank 14 via the direction control valve 5. In FIG. 22, the rack of the rack and pinion 104 is indicated so that the axis thereof is different by 90 degrees.

The power steering controller of this embodiment is further provided with a steering power changing unit 105 for changing the steering power (tactile feedback) of the steering wheel 4.

The steering power changing unit 105 is provided on a coupling section located between an input shaft 4a, through which the turn of the steering wheel 4 is entered, and an output shaft 104a, which is connected integral with the pinion gear side of the rack and pinion 104. This unit 105 is actuated by the hydraulic oil supplied from the hydraulic pump 7. The input shaft 4a and the output shaft 104a are relatively rotatable within a predetermined range; the directional switching of the directional control valve 5 is performed by the difference in rotational angle between the input shaft 4a and the output shaft 104a.

The steering power changing unit 105 is equipped with a plurality of plungers which hydraulically slide toward the output shaft 104a although no detailed illustration is given. These plunger$_s$ press the input shaft 4a upon receipt of oil pressure, thus suppressing the relative rotation of the input shaft 4a and the output shaft 104a. When the force of the plungers pressing the input shaft 4a is large, the relative rotation of the input shaft 4a and the output shaft 104a decreases, thus suppressing the operation of the direction control valve 5. As a result, the steering power (tactile feedback) of the steering wheel 4 increases (feels heavier). When the force of the plungers pressing the input shaft 4a is small, the relative rotation of the input shaft 4a and the output shaft 104a increases, permitting easy operation of the direction control valve 5. As a result, the steering power (tactile feedback) of the steering wheel 4 decreases (feels lighter). The steering power of the steering wheel 4 can be continuously changed by continuously changing the force of the plungers pressing the input shaft 4a.

Regarding a hydraulic system of the steering power changing unit 105, connected to the oil pressure supply port of the steering power changing unit 105 is a branch pipe 106 extending from some midpoint of a supply pipe 101, which connects the hydraulic pump 7 and the direction control valve 5. At some midpoint of the branch pipe 106, an electromagnetic pressure control valve 107 is provided, and through this pressure control valve 107, the hydraulic oil discharged from the hydraulic pump 7 is supplied to the steering power changing unit 105. The hydraulic oil supplied to the steering power changing unit 105 flows into the pressure chamber of a plunger, and is discharged into the return pipe 103 via a pipe 108 through an orifice (not shown).

The working oil pressure supplied to the steering power changing unit 105, i.e., the pressure applied to the plungers, is adjusted in accordance with the value of electric current supplied to a solenoid 107a of the pressure control valve 107 which is electrically connected to the controller 15 for controlling the value of the current supplied to the solenoid 107a. Thus, the pressure control valve 107 is controlled by the amount of current supplied to the solenoid 107a. However, turning ON or OFF of the electric current supplied to the solenoid 107a may be duty-controlled.

Hence, the steering power of the steering wheel 4 can be controlled by controlling the value of the current supplied to the solenoid 107a of the pressure control valve 107.

When the value of current supplied to the solenoid 107a is maximum, the pressure control valve 107 is closed and no working oil pressure is supplied to the steering power changing unit 105, allowing the input shaft 4a and the output shaft 104a to relatively rotate without resistance. As a result, the direction control valve 5 operates normally and the power cylinder also normally operates, resulting in low power required for steering the steering wheel 4. As the value of current supplied to the solenoid 107a decreases, the opening degree of the pressure control valve increases and the working oil pressure supplied to the steering power changing unit 105 increases, suppressing the relative rotation of the input shaft 4a and the output shaft 104a. As a result, the operation of the direction control valve 5 is suppressed and the operation of the power cylinder 2 is accordingly suppressed, leading to high power required for steering the steering wheel 4.

The controller 15 receives, as input parameters, the vehicle speed V (corresponding to the aforesaid vehicle speed signal "vx") from the vehicle speed sensor 26, and the information on road traffic condition (corresponding to the aforesaid city area degree r_city, etc.) and the information on maneuvering state (corresponding to the aforesaid sportiness "drive") obtained by the estimating method described previously. Based on these input parameters, the controller 15 calculates the value of current to be supplied to the solenoid 107a of the pressure control valve 107.

The desired (ideal) steering power characteristic of the steering wheel 4 for each road traffic condition and maneuvering state are shown in Table 3. According to Table 3, lower power required for steering is preferable when the road traffic condition is a city road and the maneuvering state, i.e., the sportiness, is low, while a slightly higher power required for steering is preferable when the sportiness is high. Further, when the road traffic condition is an expressway and the sportiness is low, slightly higher power required for steering is preferable, while higher power required for steering is preferable when the sportiness is high. When the road traffic condition is a jammed road, the steering power should be low regardless of the sportiness. Moreover, when the road traffic condition is a mountainous road and the sportiness is low, the steering power should be low, and when the sportiness is high, the steering power should be high.

TABLE 3

| Road Traffic Condition | Low ←——— Maneuvering State (Sportiness "drive") ———→ High | | |
|---|---|---|---|
| City Area | Low steering power | ←——   ——→ | Slightly high steering power |
| Expressway | Slightly high steering power | ←——   ——→ | High steering power |
| Jammed Road | ←——  Low steering power  ——→ | | |
| Mountainous Road | Low steering power | ←——   ——→ | High steering power |

The expressway degree as the road traffic condition is not estimated from the estimating method described above, however, the expressway degree can be defined as the one taking a value, which is exactly the opposite from the city road degree. Hence, when the city road degree is small, the expressway degree takes a large value, and when the city road degree is large, the expressway degree takes a small value.

In this case, the maximum estimated value of the city road degree is "10," the expressway degree is calculated from the following formula.

(Expressway degree)=10–(City road degree)

Figure 23:
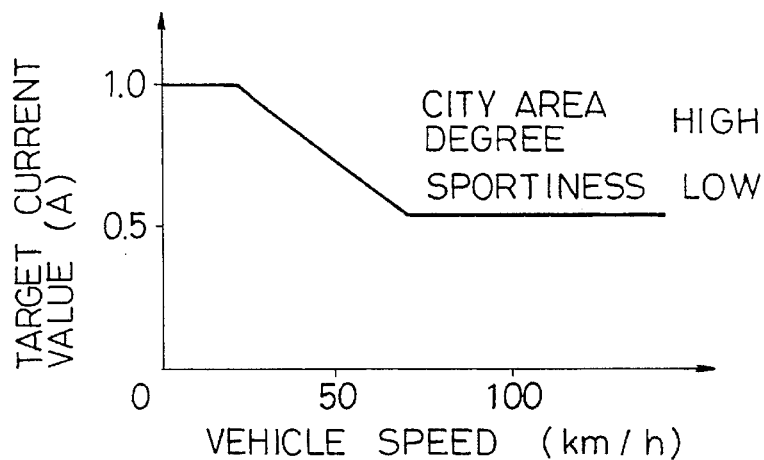
FIG. 23 is a graph showing a vehicle speed vs. electric current characteristic.

The vehicle speed vs. current characteristic map shown in FIG. 23 is stored in the memory of the controller 15 in advance. The controller 15 determines a target current value suited for the vehicle speed in accordance with the map, and supplies electric current to the solenoid 107a according to the target current value. The map of characteristic is established based on a case wherein the city road degree is minimum (the expressway degree is high) and the level of sportiness is minimum.

Up to a vehicle speed of 20 km/h, for example, the target current value takes a maximum value (e.g., 1A). When the vehicle speed is in the range of 20 to 70 km/h, for example, the target current value decreases at a fixed rate from the maximum value as the vehicle speed increases. When the vehicle speed exceeds, for example, 70 km/h, the target current value stays at a fixed current value (e.g., 0.55A), which is approximately half the maximum value. The current supplied to the solenoid takes a different value, depending on the standard of the solenoid.

Figure 24:
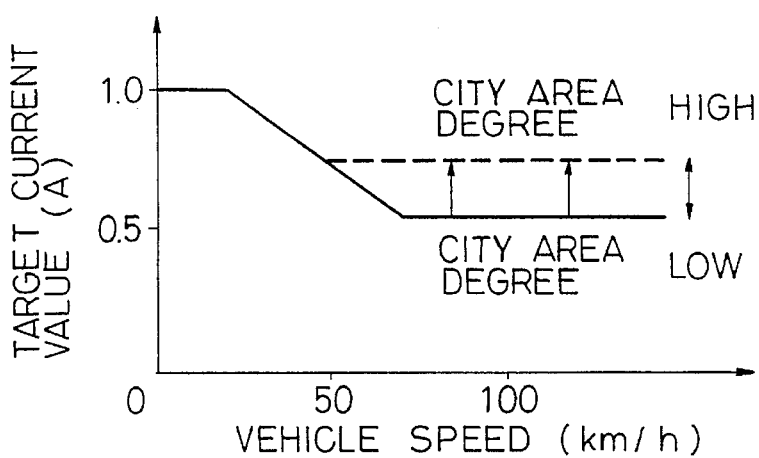
FIG. 24 is a graph showing a vehicle speed vs. city area degree vs. electric current characteristic.

The controller 15 corrects the electric current characteristic in accordance with changes in the road traffic condition and maneuvering state. More specifically, the controller 15 corrects the current characteristic as shown by the broken line in FIG. 24 in accordance with an entered city area degree (r_city). In other words, the target current value of the current characteristic is corrected so that the target current value increases as the city area degree increases. As a result, the steering power of the steering wheel 4 decreases (feels lighter) as the city area degree increases. On the other hand, the controller 15 sets the target current value to the maximum value (e.g., 1A) regardless of the maneuvering state when it receives especially the jammed road degree as the information on the road traffic condition. This gives an extremely light steering power of the steering wheel 4, providing an optimum steering characteristic for driving on the jammed road.

Figure 25:
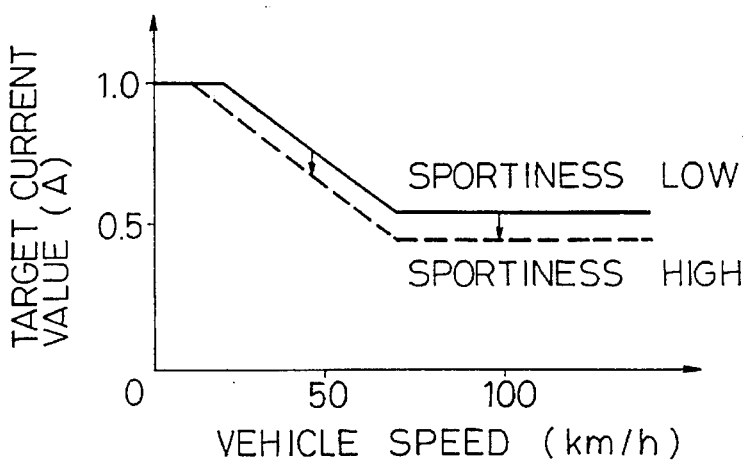
FIG. 25 is a graph showing a vehicle speed vs. sportiness vs. electric current characteristic.

The controller 15 corrects the current characteristic as shown by the broken line in FIG. 25 in accordance with the sportiness "drive" which it receives. Specifically, the target current value of the current characteristic is corrected so that the target current value takes a smaller value as the sportiness "drive" increases. As a result, the steering power of the steering wheel 4 increases (feels heavier).

Results of tests with an actual vehicle revealed that the mountainous road degree can be considered to lie midway between the city road degree and the expressway degree; therefore, it was decided that the parameter for correcting the current characteristic should be applied only to the city area degree (r_city).

As described above, the power steering controller of this embodiment is designed to variably control the value of current supplied to the solenoid of the pressure control valve, which is the control parameter of the power steering controller, in accordance with the city road degree and the like, serving as the road traffic condition. This makes it possible to variably adjust the steering power characteristic of the steering wheel in accordance with the city road degree and the like. As a result, the vehicle is provided with the steering characteristic of the steering wheel, which matches the road traffic condition.

In addition, the value of current supplied to the solenoid of the pressure control valve, which is the control parameter of the power steering controller, is variably controlled in accordance with the neural network output "drive" indicative of the sportiness as the maneuvering state intended by the driver. This makes it possible to variably adjust the steering power characteristic of the steering wheel in accordance with the sportiness. As a result, when the driver's sportiness in driving increases, the vehicle is provided with the steering characteristic of a sporty car, while it is provided with the steering characteristic of a luxury car when the sportiness decreases and leisurely operation takes over.

A vehicle running characteristic control method according to a fourth embodiment of the present invention will now be described.

This embodiment is applied to a motorcar, which is equipped with a speed change controller of an automotive automatic transmission as the apparatus for controlling the vehicle running characteristic.

Figure 26:
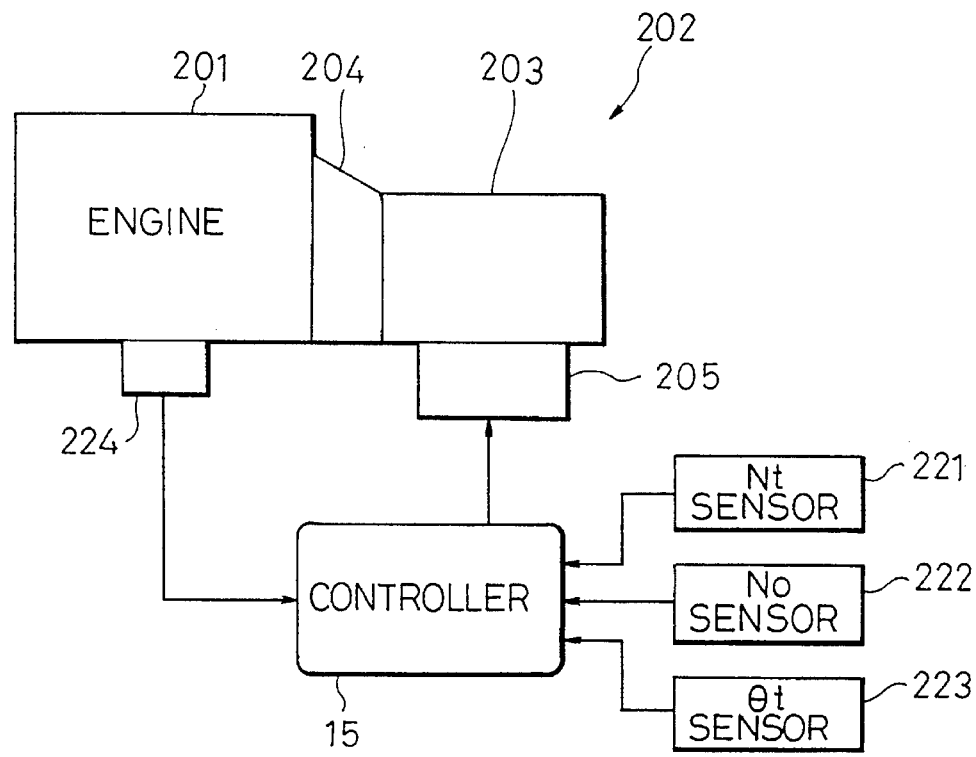
FIG. 26 is a schematic configuration diagram of a speed change controller of an automatic transmission mounted on a vehicle, to which a vehicle running characteristic control method according to a fourth embodiment of the present invention is applied.

FIG. 26 shows the schematic configuration of the automatic transmission of the motorcar according to the present invention. In the drawing, numeral 201 denotes an internal combustion engine, the output of the engine 201 being transmitted to driving wheels (not shown) via the automatic transmission 202. The automatic transmission 202 includes a torque converter 204, a gear transmission 203, a hydraulic circuit 205, a controller 15, etc. The gear transmission 203 is equipped with, for example, a gear train of 4 steps forward and 1 step backward, and many speed change friction-engaged means for changing the gear ratio of the gear train, to thereby effect a speed change operation. The speed change friction-engaged means are hydraulic clutches or hydraulic brakes, for example.

Figure 27:
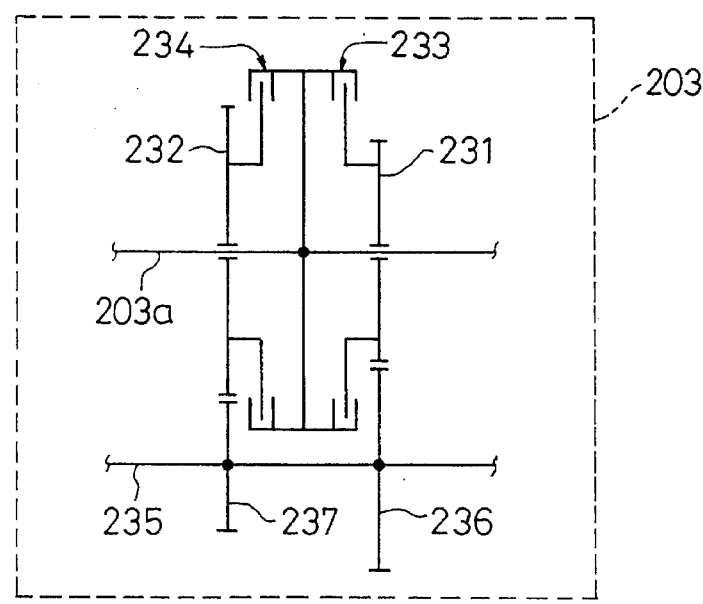
FIG. 27 is a schematic configuration diagram showing a part of a gear train in a gear transmission shown in FIG. 26.

FIG. 27 shows a part of the configuration of the gear transmission 203. A first driving gear 231 and a second driving gear 232 are rotatably disposed around the input shaft 203a. Further, hydraulic clutches 233 and 234 serving as the speed change friction-engaged means are fixed on the input shaft 203a between the first driving gear 231 and the second driving gear 232. The driving gears 231 and 232 rotate with the input shaft 203a as one piece when they are in engagement with the clutches 233 and 234. An intermediate transmission shaft 235 disposed in parallel to the input shaft 203a is coupled to a driving axle via a final reduction gear, not shown. Fixed on the intermediate transmission shaft 235 are a first driven gear 236 and a second driven gear 237. These driven gears 236 and 237 mesh with the driving gears 231 and 232.

Hence, when the clutch 233 is engaged with the first driving gear 231, the revolution of the input shaft 203a is transmitted to the clutch 233, the first driving gear 231, the first driven gear 236, and the intermediate transmission shaft 235. This establishes the first speed, for example. When the clutch 234 is engaged with the second driving gear 232, the revolution of the input shaft 203a is transmitted to the clutch 234, the second driving gear 232, the second driven gear 237, and the intermediate transmission shaft 235, thus establishing the second speed. The automatic transmission 2 upshifts the first speed to the second speed by engaging the clutch 234 on the second speed side while disengaging the clutch 233 on the first speed side. Conversely, the automatic transmission 202 downshifts the second speed to the first speed by engaging the clutch 233 while disengaging the clutch 234.

Figure 28:
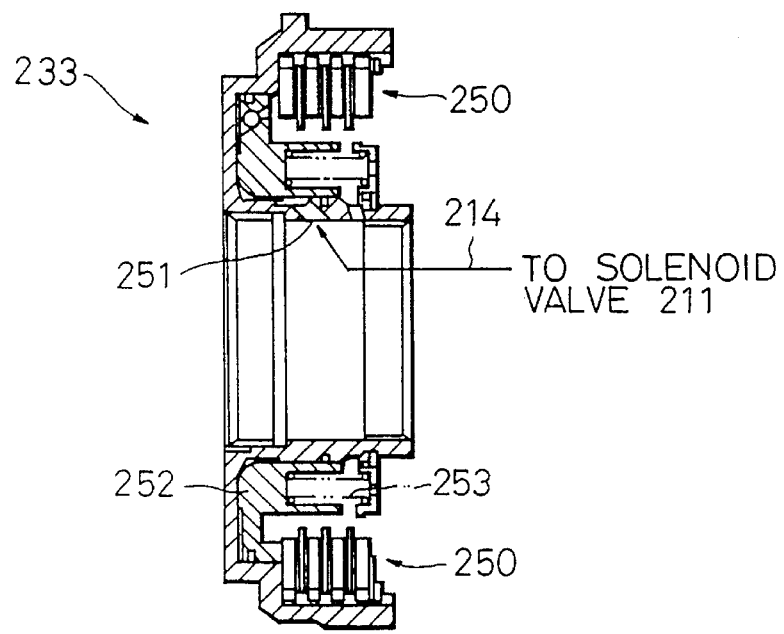
FIG. 28 shows a clutch shown in FIG. 26.

The clutches 233 and 234 are hydraulic multiple disc clutches. FIG. 28 shows the cross section of the clutch 233; the clutch 233 has many frictionally engaging discs 250. When hydraulic oil is supplied from an oil path 214, which will be discussed later, to the clutch 233 via a port 251, a piston 252 is moved forwardly to cause all the frictionally engaging discs to be frictionally engaged with each other. The frictional engagement of the frictionally engaging discs 250 is released when the piston 252 is pressed and moved back by a return spring 253, while discharging the hydraulic oil into the oil path 214 via the port 251.

The engagement of the clutch 233 can be completely released by making the frictionally engaging discs 250 stand by in a standby position thereof. In the standby position, clearances for preventing the so-called dragging torque from taking place are provided between the frictionally engaging discs 250. Therefore, to engage the clutch 233, it is necessary to remove the clearances. To be more specific, the frictionally engaging discs 250 must be moved by a dead stroke toward a position at which the aforesaid clearances are almost nulled, which is immediately short of that position at which frictional engagement takes place. The time for removing the clearances is required. On the other hand, with the clutch 233 engaged, the above-mentioned dragging torque takes place for a while after the frictionally engaging discs 250 start to separate; therefore, an oil pressure releasing time is required as an idle time, which follows the start of discharging the hydraulic oil from the clutch 233, until the engagement of the clutch 233 is completely released.

The clutch 234, which has the same configuration as that of the clutch 233, requires a predetermined clearance removing time at the time of engagement, and a predetermined oil pressure releasing time at the time of disengagement.

The hydraulic circuit 205 has duty solenoid valves (hereinafter referred to simply as solenoid valves), which correspond to the aforesaid individual speed change frictionally engaging means. It operates the individual speed change frictionally engaging means, i.e., the clutches and brakes, independently from each other. The solenoid valves operate the clutches and brakes in the same manner; therefore, the description will be given to the solenoid valve for operating the clutch 233 with reference to FIG. 29, the explanation on other solenoid valves being omitted.

Figure 29:
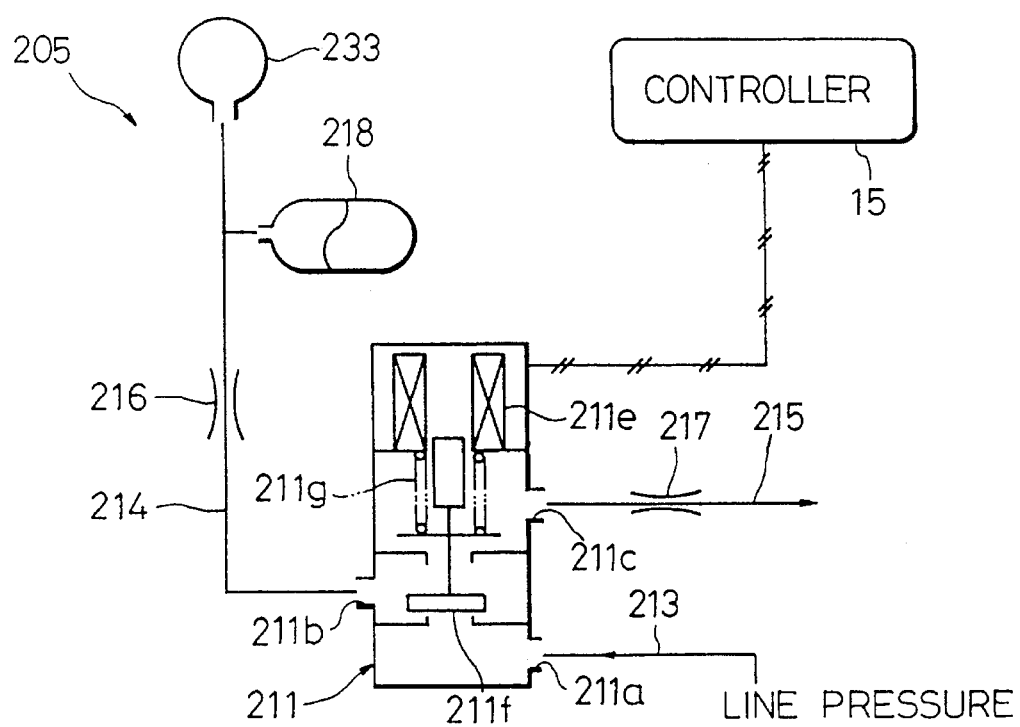
FIG. 29 is a schematic configuration diagram showing a part of a hydraulic circuit for operating the clutch shown in FIGS. 27 and 28.
Figure 30:
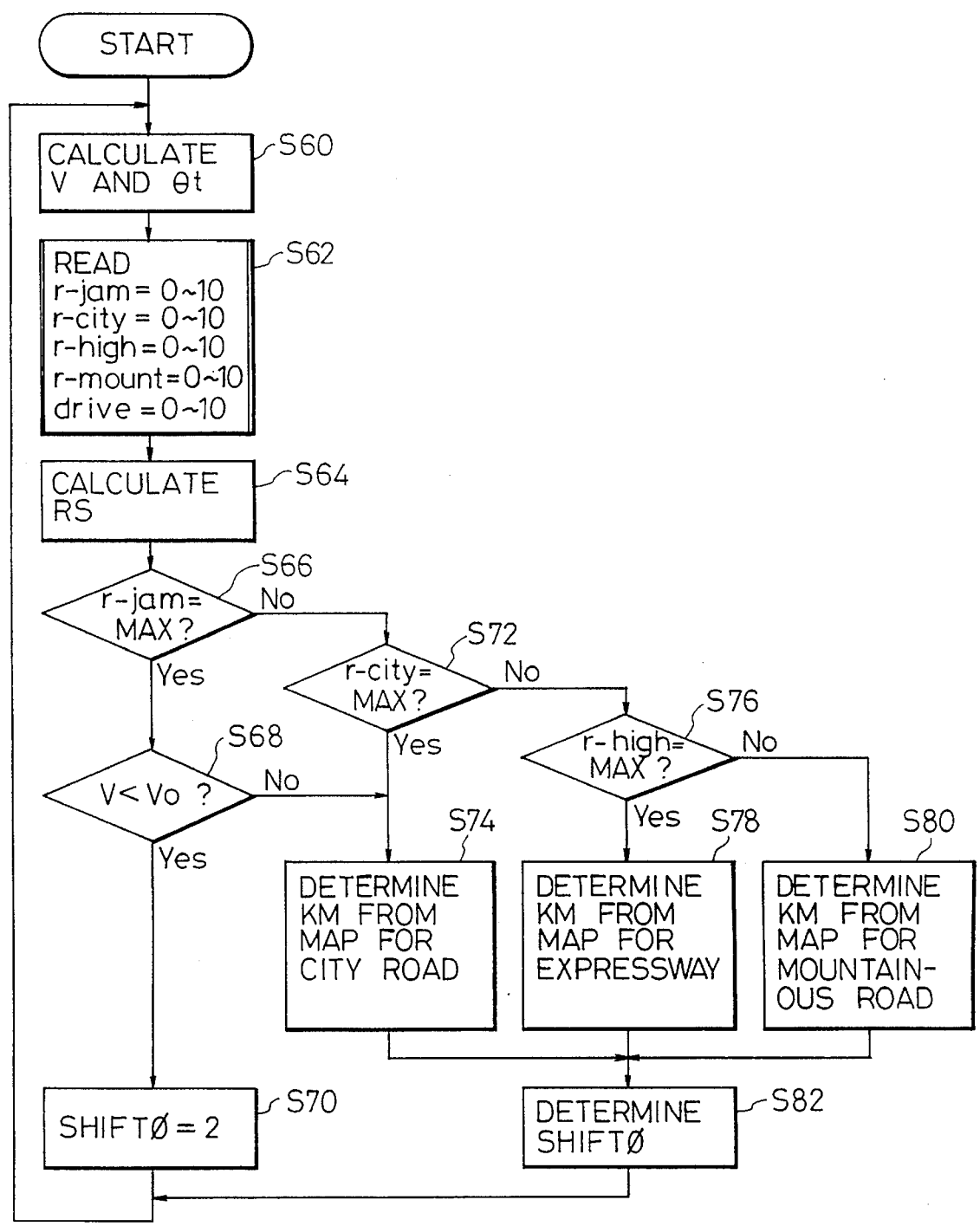
FIG. 30 is a flowchart of a shift control routine.

FIG. 29 shows a part of the hydraulic circuit 205, which is equipped with a solenoid valve 211 for supplying oil pressure to the hydraulic clutch 233. The solenoid valve 211 is a normally-closed, 2-position switching valve, and has ports 211a through 211c at three points.

Connected to a first port 211a is a first oil path 213, which extends to an oil pump (not shown). A regulating valve or the like, not shown, is provided at some midpoint of a first oil path 213, so that a hydraulic pressure (line pressure) adjusted to a predetermined level is supplied.

Connected to a second port 211b is a second oil path 214 extending to the hydraulic clutch 233, and connected to a third port 211c is a third oil path 215 extending to an oil tank, which is not illustrated. Provided at some midpoints of these second and third oil paths 214 and 215 are restrictors 216 and 217, respectively. The passage area of the restrictor 216, which is provided in the second oil path 214, is larger than that of the passage area of the restrictor 217 provided in the third oil path 215. Further, an accumulator 218 is connected to some midpoint of the second oil path 214 between the clutch 233 and the restrictor 216.

The solenoid valve 211, which is electrically connected to the controller 15, is controlled based on duty ratio at a predetermined cycle, e.g., a 50-Hz control cycle, by the controller 15. While a solenoid 211e of the solenoid valve 211 stays de-energized, a valve body 211f is pressed by a return spring 211g, to prevent communication between the first port 211a and the second port 211b and to allow communication between the second port 211b and the third port 211c. Conversely, while the solenoid 211e stays energized, the valve body 211f lifts against the spring force of the return spring 211g, to permit communication between the first port 211a and the second port 211b and to prevent communication between the second port 211b and the third port 211c.

Electrically connected to the input side of the controller 15 are various sensors such as an Nt sensor 221, No sensor 222, and θt sensor 223. The Nt sensor 221 is a turbine rotational speed sensor for detecting the rotational speed Nt of the turbine of the torque converter 204 (i.e., the input shaft of the gear speed changer 203). The No sensor 222 (corresponding to the vehicle speed sensor 22 previously mentioned) is a transfer drive gear rotational speed sensor for detecting the rotational speed No of the transfer drive gear, not shown. The controller 15 computes the vehicle speed V (corresponding to the vehicle speed "vx" previously mentioned) in accordance with the rotational speed No. The θt sensor 223 (corresponding to the throttle opening degree sensor 23 previously mentioned) is a throttle valve opening degree sensor for detecting the valve opening degree θt of a throttle valve disposed at some midpoint of an intake passage (not illustrated) of the engine 201. These sensors 221 through 223 supply detected signals to the controller 15 at predetermined intervals.

Further supplied to the controller 15 are the road traffic condition and the parameters (e.g., jammed road degree "r_jam," city road degree "r_city," expressway degree "r_high," mountainous road degree "r_mount," and sportiness "drive") indicative of the maneuvering state intended by the driver, which are calculated according to the estimating method described previously.

"Procedure for implementing a shift change"

A procedure for deciding an optimum command shift stage in accordance with received detection signals and parameters, and for carrying out a shift change according to the command shift stage is stored beforehand in the memory of the controller 15. The controller 15 causes a coupled-side clutch, e.g., the clutch 233, to be disengaged, and a released-side clutch, e.g., the clutch 234, to be engaged, to thereby accomplish the shift change in the automatic transmission 202, by repeatedly executing the shift change procedure at predetermined intervals.

Figure 41:
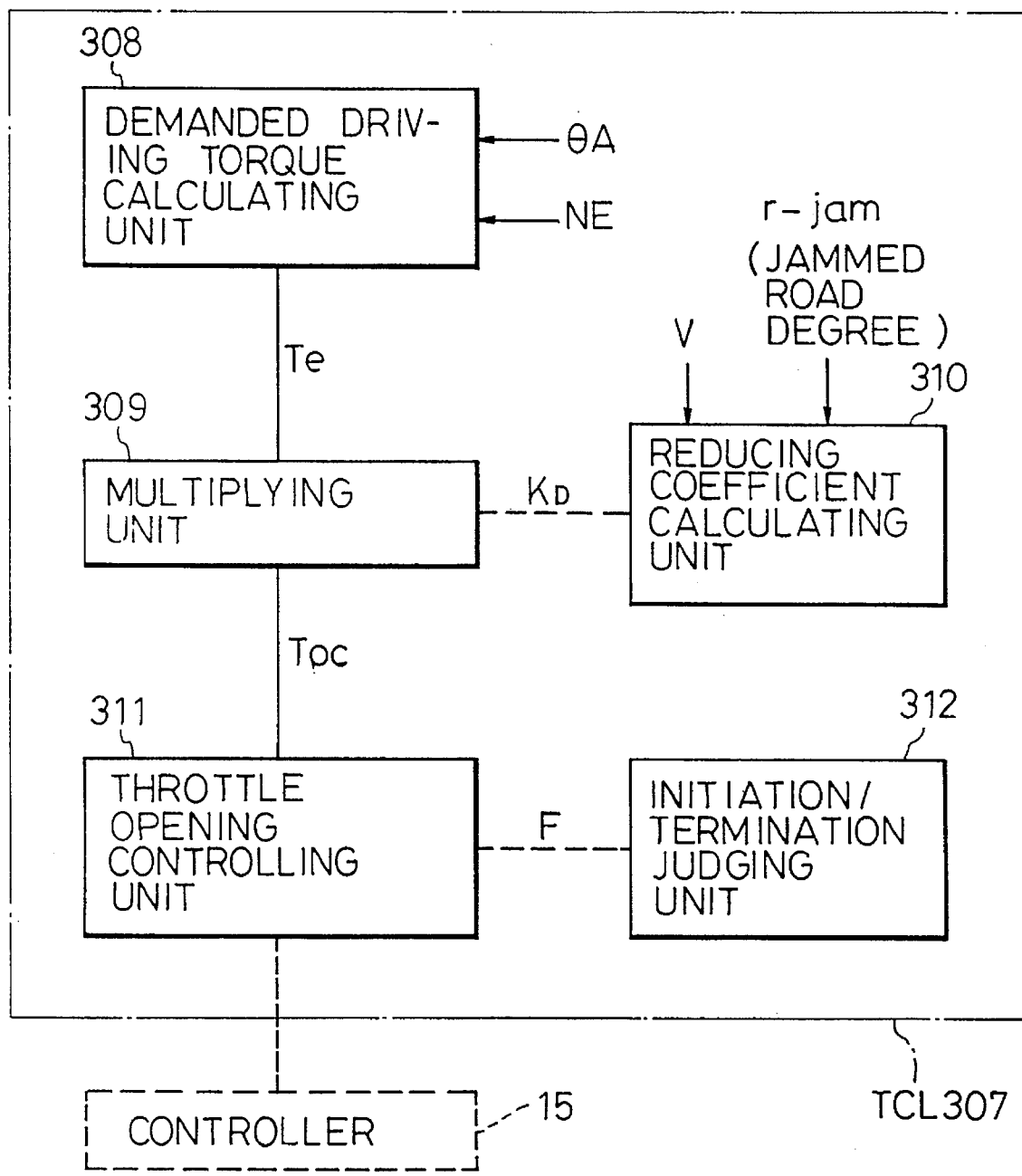
FIG. 41 is a block diagram of a torque computing unit (TCL)
Figure 42:
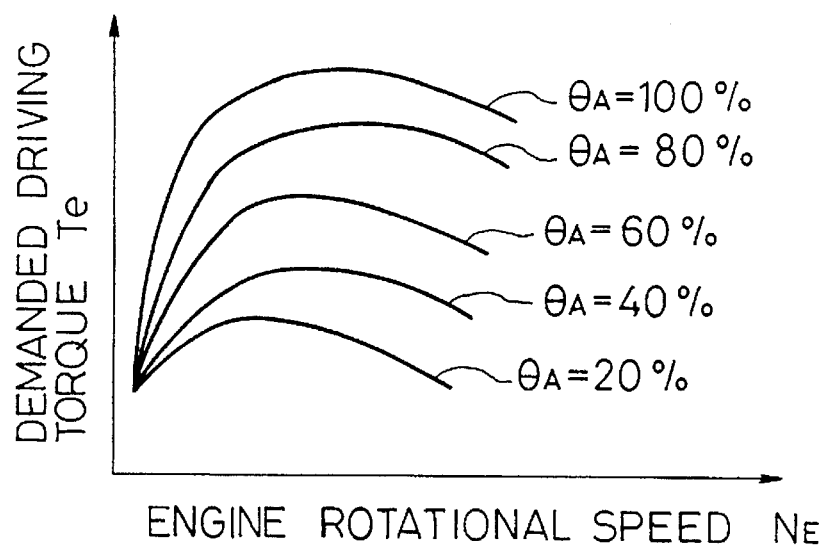
FIG. 42 is an engine speed vs. required driving torque vs. accelerator opening degree map.

The following describes the procedure for carrying out the shift change with reference to flowcharts shown in FIGS. 41 and 42.

First, in a step S60, the controller 15 calculates the vehicle speed V from the output of the vehicle speed sensor (No sensor 22) and the throttle opening degree θt from the output of the throttle opening degree sensor (θt sensor 23). Then, in a step S62, the controller 15 reads the jammed road degree r_jam, the city road degree r_city, the expressway degree r_high, and the mountainous road degree r_mount, which are the road condition parameters calculated according to the aforesaid estimating method. Next, it converts the values of the read input values in the range of "0 to 100" into the values in the range of "0 to 10." The controller 15 also reads the sportiness "drive," which is the maneuvering state parameter calculated from the estimating method, and converts the read input value in the range of "0 to 100" into the value in the range of "0 to 10."

The expressway degree r_high is not calculated from the aforesaid estimating method, but it can be assumed to take a value, which is exactly opposite from that of the city road degree r_city. Hence, the expressway degree r_high can be defined as a value obtained by subtracting the value of the city road degree r_city from "10."

In a step S64, the controller 15 calculates a road slope RS in accordance with the output signal from a slope sensor mounted on the vehicle or in accordance with an engine output and the output signal from an acceleration sensor (not shown). The controller 15 then determines whether the obtained jammed road degree r_jam is a maximum value MAX, e.g., "10" (step S66). If the determination result is affirmative, then the controller determines whether the vehicle speed V is smaller than a predetermined vehicle speed V0 (e.g., 40 km/h) (step S68). If the determination result is affirmative, then the controller sets a shift command variable SHIFT0 to "2" (step S70), and carries out the shift change in accordance with a preset shift map for holding the second speed.

The shift map for holding the second speed has a wider vehicle speed area in which the second speed is maintained, by moving a part of the 2→3 upshift line toward the higher speed side, no 2→1 downshift line being provided. Accordingly, when the road traffic condition is the traveling on a jammed road at a vehicle speed of 40 km/h, the speed change gear is held at the second gear in accordance with the shift map for holding the second speed. In this state where the second speed is held, even if the vehicle speed becomes "0" and hence the vehicle stops temporarily, the second speed state is maintained. Therefore, even if stop and start are repeated frequently, smooth start free from a speed change shock is assured, and proper engine braking is allowed to be accomplished at the time of deceleration.

Figure 33:
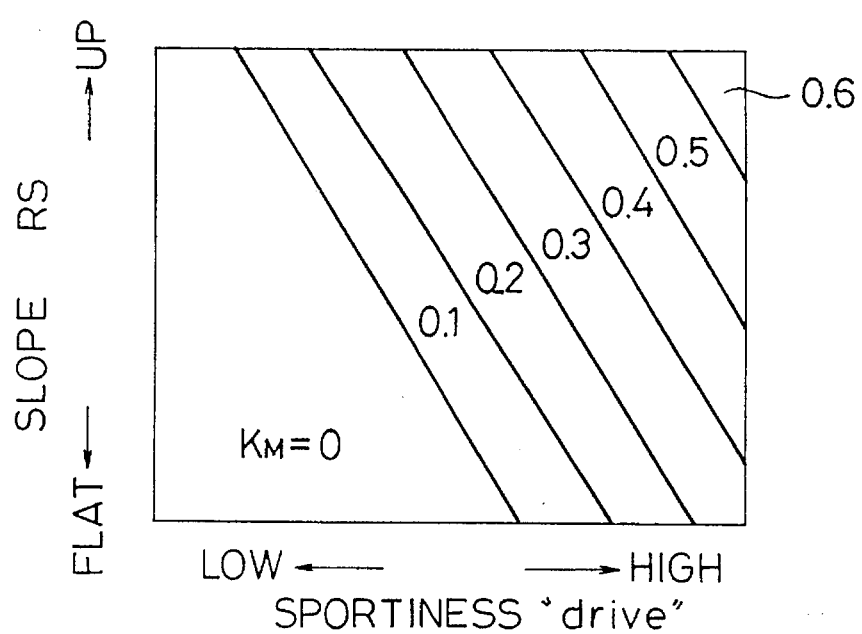
FIG. 33 is a graph showing a sportiness vs. slope vs. shift line moving coefficient KM map used for vehicle traveling on a city road.

On the other hand, if the determination result in the step S66 is negative, then a shift pattern moving mode is established. The controller 15 determines whether the city road degree r_city is the maximum value MAX, e.g., "10" (step S72). If the determination result is affirmative, then the controller 15 carries out a step S74 to be discussed later. If the determination result of the step S68 is negative, that is, if the vehicle speed is 40 km/h or more even if the road is determined to be jammed, then the second speed holding mode is released and the shift pattern moving mode is entered. The controller 15 determines a shift line moving coefficient KM from the relationship between the sportiness "drive" and the road slope (RS) in accordance with the map for city area shown in FIG. 33 (step S74). The range of the shift line moving coefficient KM is, for example, 0 to 1.0.

Figure 34:
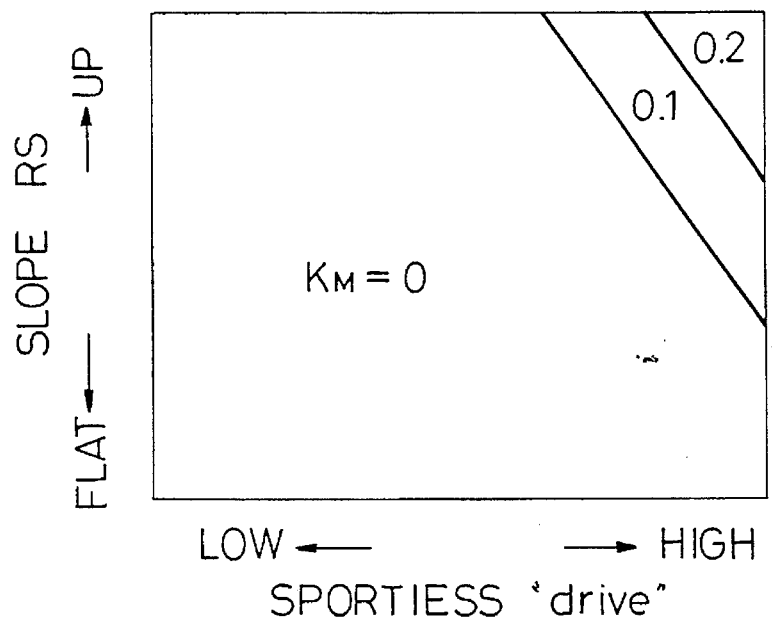
FIG. 34 is a graph showing a sportiness vs. slope vs. shift line moving coefficient KM map used for vehicle traveling on an expressway.

If the determination result in the step S72 is negative, then the controller 15 determines whether the expressway degree r_high is the maximum value "10" (step S76). If the determination result is affirmative, then the controller obtains the shift line moving coefficient KM from the relationship between the sportiness "drive" and the road slope RS in accordance with the map for expressway shown in FIG. 34 (step S78).

Figure 35:
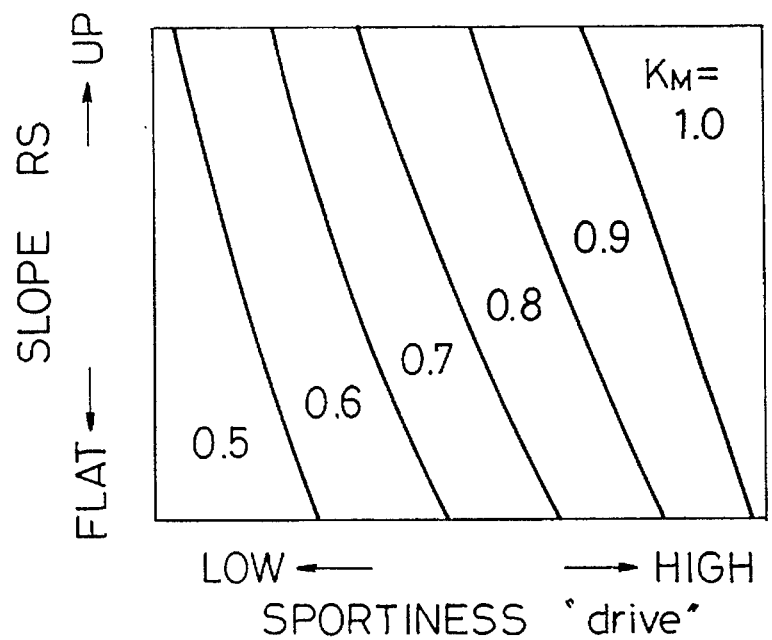
FIG. 35 is a graph showing a sportiness vs. slope vs. shift line moving coefficient KM map used for vehicle traveling on a mountainous road.

If the determination result in the step S76 is negative, the controller 15 obtains the shift moving line coefficient KM from the relationship between the sportiness "drive" and the road slope RS in accordance with the map for mountainous road shown in FIG. 35 (step S80).

The shift line moving coefficient KM determined in the above steps takes a large value when the ascending degree of the road slope RS is large and the sportiness "drive" indicative of the driver's maneuvering state is large. The value taken by the shift line moving coefficient KM increases in the order of the expressway, city road, and mountainous road, which indicate the road traffic conditions.

After the step S74, S78 or S80 is executed, the controller 15 implements a command shift stage SHIFT0 calculating routine in a step S82.

"Routine for calculating the command shift stage"

Figure 31:
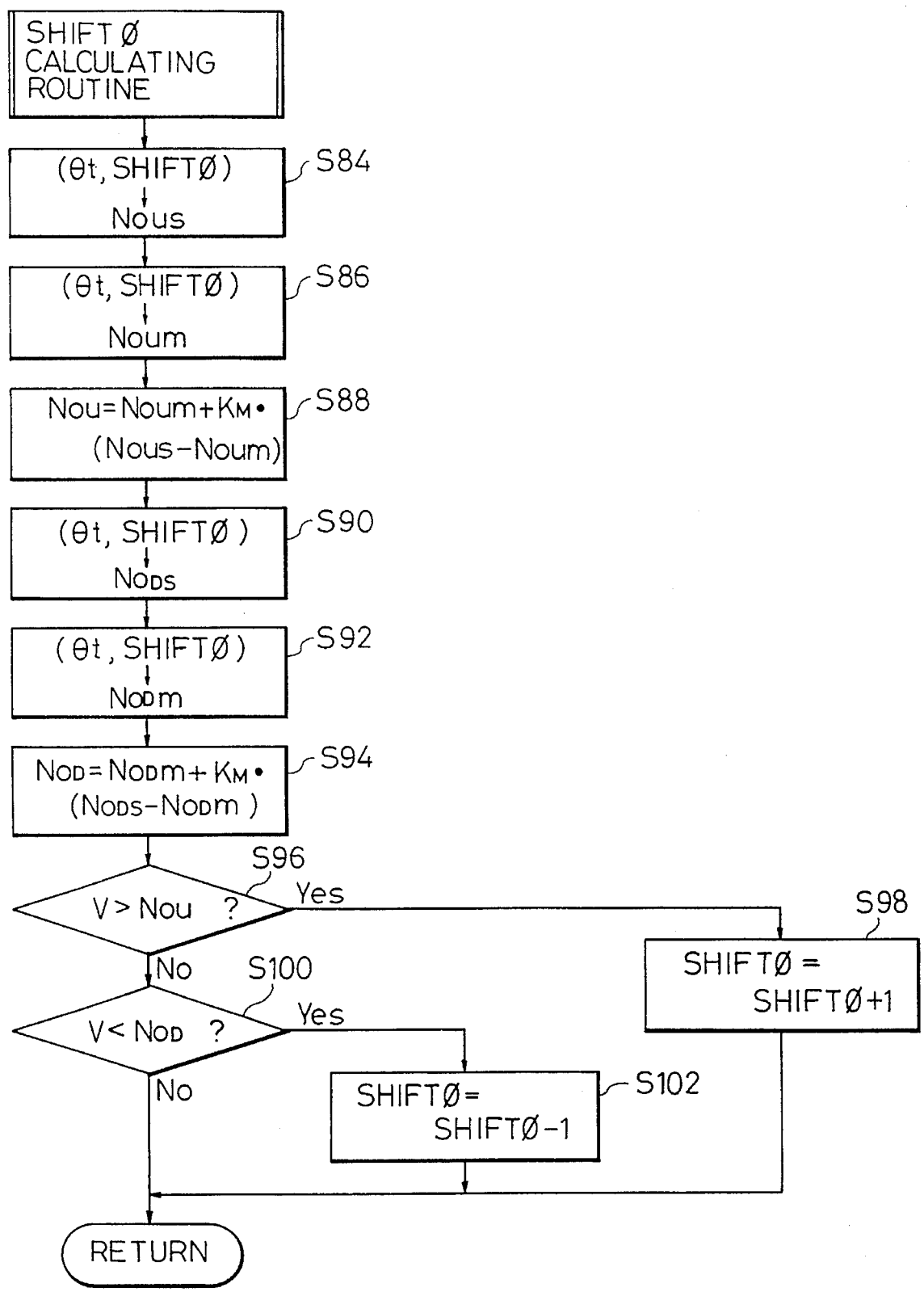
FIG. 31 is a flowchart of a command shift stage SHIFT0 calculating routine.
Figure 32:
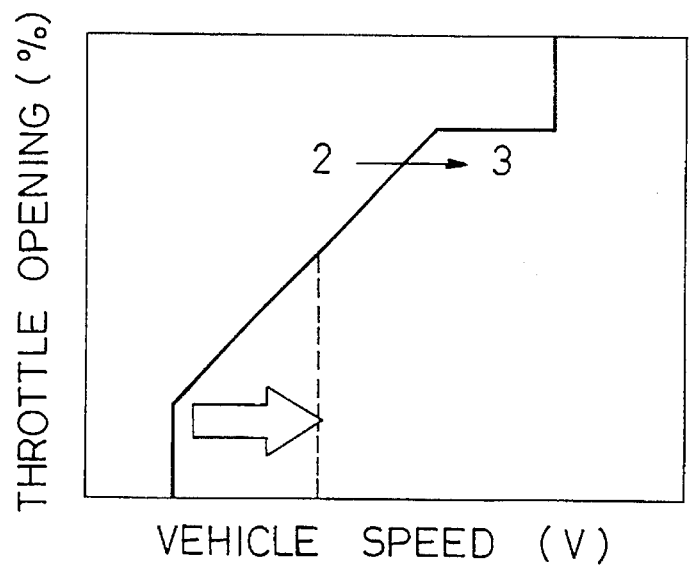
FIG. 32 is a shift map for a second-speed holding mode.

The procedure for implementing the command shift stage SHIFT0 calculating routine will now be described according to the flowchart of FIG. 31 with reference to FIGS. 36 and 37. In explaining the executing procedure, the present shift stage is in the second gear (command shift stage SHIFT0= 2).

Stored in the memory of the controller 15 are two types of basic shift maps; a plurality of upshift maps classified for the upshift lines of 1→2, 2→3, and 3→4, respectively, and a plurality of downshift maps classified for the downshift lines of 4→3, 3→2, and 2→1, respectively. Each shift line has two types of basic shift patterns, namely, a mild pattern for accomplishing a gentle shift change and a sport pattern for accomplishing an agile shift change. FIG. 36 shows only the upshift line of 2→3, while FIG. 37 shows only the downshift line of 2→1. The same applies to other shift lines, and the explanation thereon will be omitted.

In the command shift stage calculating routine, judgment vehicle speeds (NOU, NOD) are obtained from the throttle opening degree θt and the obtained shift line moving coefficient KM, and the command shift stage SHIFT0 is decided from the judgment vehicle speeds.

Figure 36:
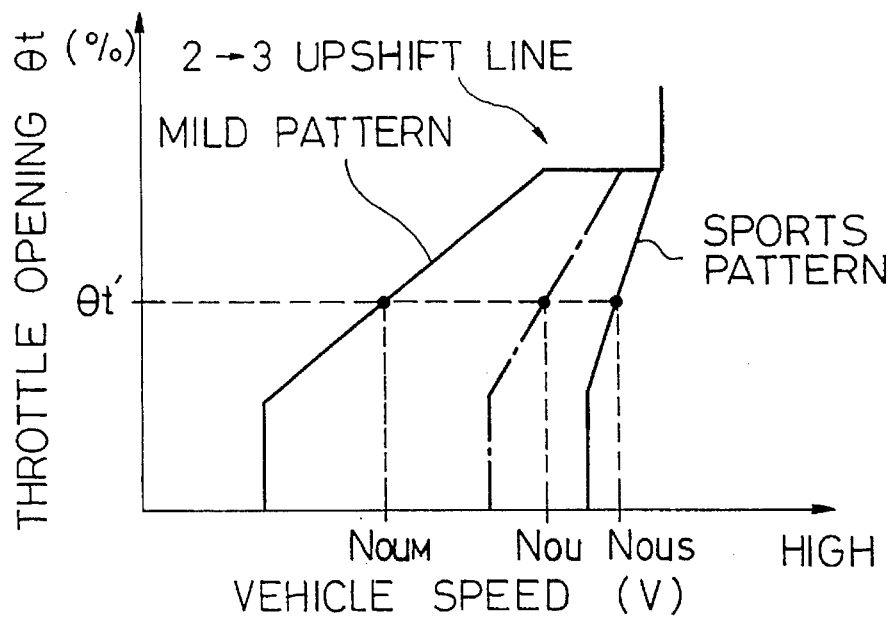
FIG. 36 is a graph showing a shift map associated with 2→3 upshift lines.

First, the controller 15 determines a vehicle speed value NOUS corresponding to an actual throttle opening degree θt' from the sport pattern of the upshift line, as shown in FIG. 36 (step S84), and determines a vehicle speed value NOUM corresponding to the actual throttle opening degree θt' from the mild pattern of the upshift line (step S86). Further, it determines the upshift speed NOU by substituting the shift line moving coefficient KM, the vehicle speed value NOUS, and the vehicle speed value NOUM for the following computing formula (step S88):

$$NOU=NOUM+KM \cdot (NOUS-NOUM)$$

The shift line moving coefficient KM ranges from 0 to 1.0; therefore, the upshift speed NOU obtained from this computing formula lies between the vehicle speed value NOUM and the vehicle speed value NOUS.

For example, when the shift line moving coefficient KM is "0," the upshift speed NOU becomes equal to the vehicle speed value NOUM. In other words, the upshift line becomes the mild pattern. If the shift line moving coefficient KM is "1.0," then the upshift speed NOU becomes equal to the vehicle speed value NOUS. In other words, the upshift line becomes the sport pattern. Moreover, when the shift line moving coefficient KM changes from 0 to 1.0, the upshift speed NOU changes between the vehicle speed value NOUM and the vehicle speed value NOUS.

Figure 38:
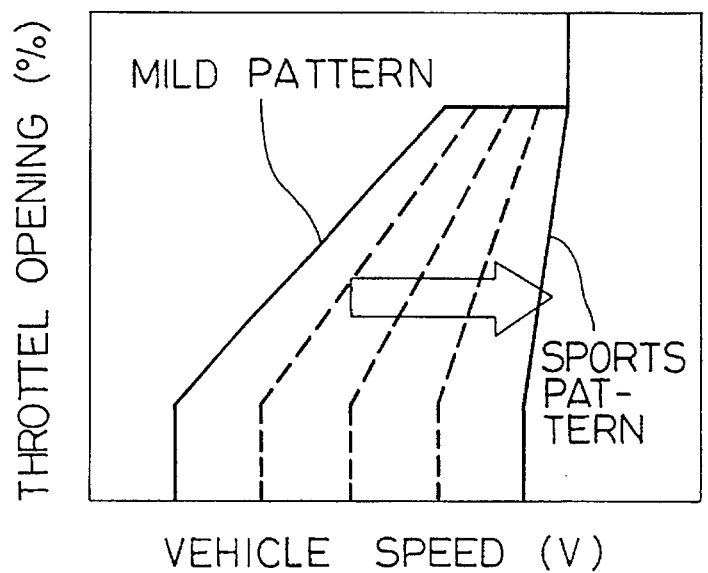
FIG. 38 is a graph showing a moving upshift line.

Assuming that the throttle opening degree θt is changed arbitrarily with a fixed shift moving coefficient KM, a presumptive upshift line indicated by a dashed line in FIG. 36 is obtained. This means that the upshift line is corrected in accordance with the shift line moving coefficient KM. As the value of the shift line moving coefficient KM changes from 0 to 1.0, the upshift line moves to the right as shown by the broken lines from the mild pattern to the sport pattern in FIG. 38.

Figure 37:
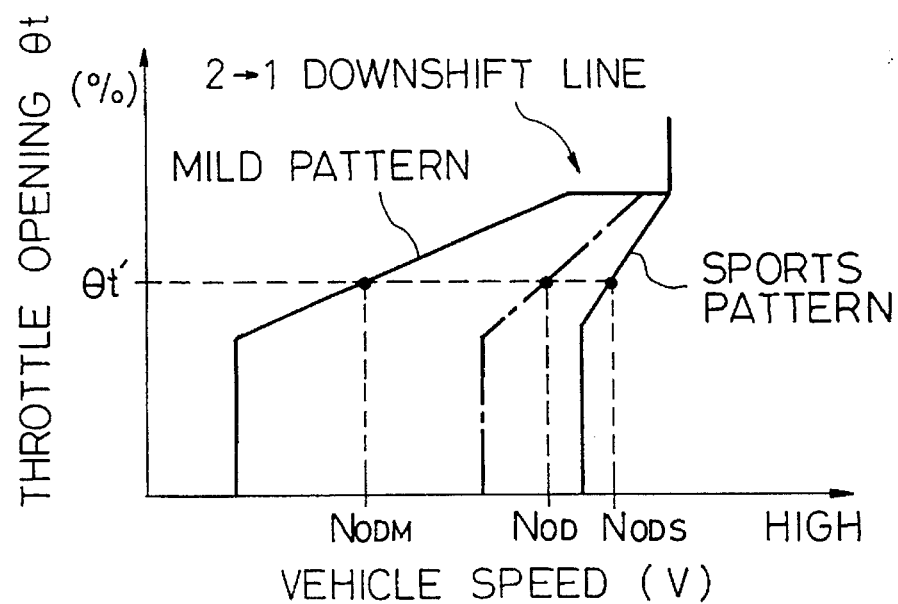
FIG. 37 is a graph showing a shift map associated with 2→1 downshift lines.

The controller 15 then determines a vehicle speed value NODS corresponding to the actual throttle opening degree θt' from the downshift line of the sport pattern shown in FIG. 37 (step S90), and determines the vehicle speed value NODM corresponding to the actual throttle opening degree θt' from the downshift line of the mild pattern (step S92). Further, it determines the downshift speed NOD by substituting the shift line moving coefficient KM, the vehicle speed value NODS, and the vehicle speed value NODS for the following computing formula (step S94):

$$NOD=NODM +KM \cdot (NODS-NODM)$$

The shift line moving coefficient KM ranges from 0 to 1.0; therefore, the downshift speed NOD obtained from this computing formula lies between the vehicle speed value NODM and the vehicle speed value NODS.

For example, when the shift line moving coefficient KM is "0," the downshift speed NOD becomes equal to the vehicle speed value NODM. In other words, the downshift line becomes the mild pattern. If the shift line moving coefficient KM is "1.0," then the downshift speed NOD becomes equal to the vehicle speed value NODS. In other words, the downshift line becomes the sport pattern. Moreover, when the shift line moving coefficient KM changes from 0 to 1.0, the downshift speed NOD changes between the vehicle speed value NODM and the vehicle speed value NODS.

Figure 39:
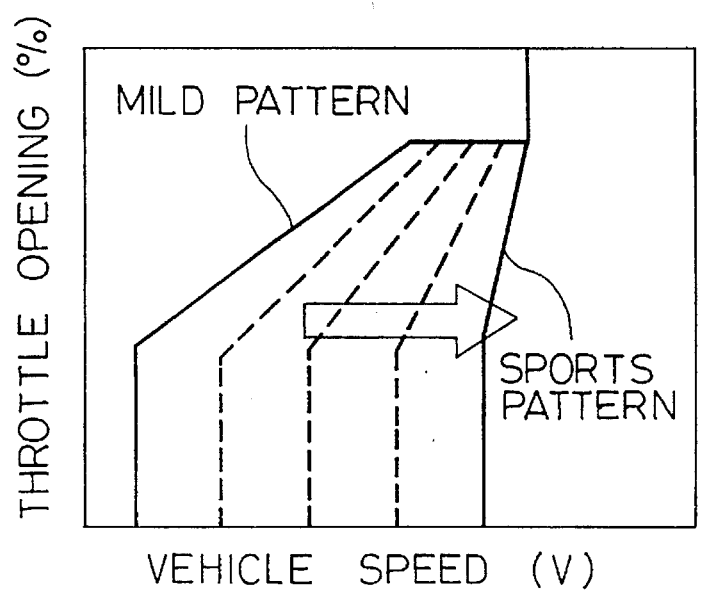
FIG. 39 is a graph showing a-moving downshift line.

Assuming that the throttle opening degree θt is changed arbitrarily with a fixed shift moving coefficient KM, a presumptive downshift line indicated by a dashed line in FIG. 37 is obtained. This means that the downshift line is corrected in accordance with the shift line moving coefficient KM. As the value of the shift line moving coefficient KM changes from 0 to 1.0, the downshift line moves to the right as shown by the broken lines from the mild pattern to the sport pattern in FIG. 39.

Then, in a step S96, the controller 15 determines whether the actual vehicle speed V read from the vehicle speed sensor is larger than the upshift speed NOU determined in the step S88. If the determination result is affirmative, then the controller adds "1" to the value of the command shift stage SHIFT0 (step S98). As a result, the controller 15 carries out upshift in accordance with the value of the command shift stage SHIFT0. In the case of this embodiment, the command shift stage SHIFT0 changes from 2 to 3; therefore, the upshift of 2→3 is implemented.

On the other hand, if the determination result in the step S96 is negative, then the controller 15 decides whether the actual vehicle speed V is smaller than the downshift speed NOD determined in the step S94 (step S100). If the determination result is affirmative, then the controller subtracts "1" from the value of the command shift stage SHIFT0 (step S102). As a result, the controller 15 carries out downshift. In the case of this embodiment, the command shift stage SHIFT0 changes from 2 to 1; therefore, the downshift of 2→1 is implemented.

If the determination result in the step S100 is negative, the routine for calculating the command shift stage SHIFT0 is terminated with the value of the command shift stage SHIFT0 kept unchanged.

As explained above, according to the speed change controller of the automotive automatic transmission according to the present invention, the shift line moving coefficient KM is determined in accordance with the road traffic conditions and the vehicle maneuvering state (sportiness "drive") obtained by the aforesaid estimating method and the road slope RS, then the shift map where the upshift line and downshift line are moved (corrected) in accordance with the shift line moving coefficient KM is obtained. Based on the shift map, the command shift stage SHIFT0 is determined to carry out the shift change. This enables shift feeling best suited for each road traffic condition and vehicle maneuvering state.

For instance, when sportily driving an acute slope of a mountainous road, the upshift line and the downshift line of the shift map are both moved to the sport pattern, to provide agile shift changes. The result is sporty shifting. Conversely, when leisurely driving a flat expressway, both the upshift line and downshift line of the shift map are moved to the mild pattern, to provide gentle shift changes. The result is leisurely shifting.

The following describes a vehicle running characteristic control method according to a fifth embodiment of the present invention.

This embodiment applies to a motorcar equipped with an engine output controller serving as an apparatus for controlling the vehicle running characteristic.

Figure 40:
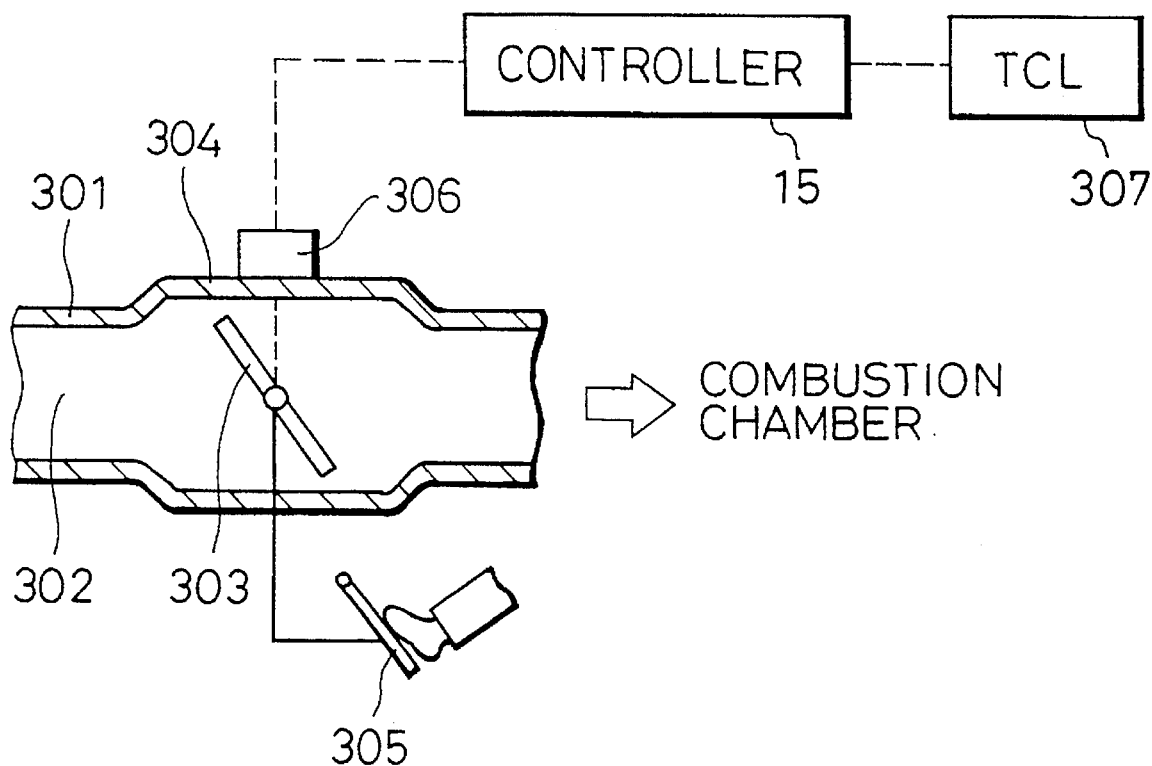
FIG. 40 is a schematic diagram showing a major section of an engine output controller mounted on a vehicle, to which a vehicle running characteristic control method according to a fifth embodiment of the present invention is applied.

Referring to FIG. 40, provided at some midpoint of an intake pipe 301 connected to the combustion chamber (not shown) of the vehicle engine is a throttle body 304 accommodating therein a throttle valve 303 which changes the opening degree (effective cross-sectional area) of the an intake passage 302 formed by the intake pipe 301, to thereby regulate the amount of intake air supplied into the combustion chamber.

The throttle valve 303 has a throttle shaft thereof rotatably journaled on the throttle body 304, so that the throttle shaft is rotated in accordance with the amount of depression of an accelerator pedal 305. The rotation of the throttle shaft turns the throttle valve 303 in the opening direction. The engine driving torque increases in accordance with the opening degree of the throttle valve 303.

The throttle valve 303 is also operated by an actuator 306 provided in the throttle body 304 in addition to the operation by the accelerator pedal 305. However, the throttle valve 303 does not open unless the accelerator pedal 305 is depressed. Specifically, the opening degree of the throttle valve 303 corresponds one-to-one to the amount of depression of the accelerator pedal 305 when the actuator 306 is not in operation. When the actuator 306 is operated, the throttle valve 303 is closed regardless of the amount of depression of the accelerator pedal 305, producing a state wherein the engine driving torque is forcibly reduced. The driving torque of the engine can be adjusted as desired, by regulating the operation of the actuator 306 in the manner described above, thereby changing the opening degree of the throttle valve 303 regardless of the amount of depression of the accelerator pedal 305.

The operation of the actuator 306 is controlled by the controller 15. The controller 15 controls the operation of the actuator 306 in accordance with the output signal received from a torque computing unit (hereinafter referred to as TCL) 307, which calculates a target driving torque of the engine. In actual use, the controller 15 carries out duty control over a torque control solenoid valve (not shown), which controls the operation of the actuator 306.

In this embodiment, when the road traffic condition is a jammed road, the driving torque of the engine is decreased in accordance with the vehicle speed, so as to make stabilized vehicle running. The target driving torque of the engine for carrying out the control is computed by the TCL 307, so that the engine driving torque is decreased as necessary.

The following explains the process taken by the TCL 307 to calculate the target driving torque Toc, referring to the block diagram of FIG. 41.

The TCL 307 is equipped with a demanded driving torque calculating unit 308 for calculating a demanded driving torque Te. This calculating unit 308 receives, as parameters, an accelerator opening $\theta_A$ from an accelerator opening sensor and an engine rotational speed NE from a crank angle sensor. In accordance with these parameters, the unit 308 reads a demanded driving torque Te from a map shown in FIG. 42 and stored beforehand in the TCL 307, and delivers the demanded driving torque Te to a multiplying unit 309.

The multiplying unit 309 receives a reducing coefficient KD (0<KD≦, for instance) from a reducing coefficient calculating unit 310, and multiplies the demanded driving torque Te by the reducing coefficient KD to thereby calculate a target driving torque Toc which is delivered to a throttle opening controlling unit 311.

Figure 43:
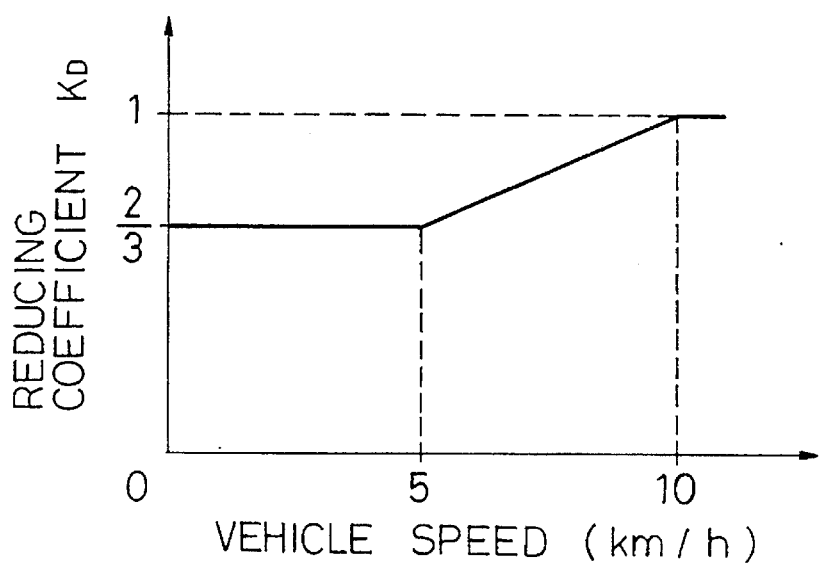
FIG. 43 is a vehicle speed vs. increasing/decreasing coefficient map.

When receiving the information on a jammed road among the road traffic conditions estimated by the aforesaid estimating method, the reducing coefficient calculating unit 310 reads a reducing coefficient KD in accordance with a vehicle speed from a map shown in FIG. 43 and stored beforehand in the TCL 307, and outputs the reducing coefficient KD to the multiplying unit 309.

In the map shown in FIG. 43, the reducing coefficient KD takes a value of "⅔" for the vehicle speed ranging from 0 km/h to 5 km/h, takes a value gradually increasing from "⅔" to "1" for the vehicle speed ranging from 5 km/h to 10 km/h, and takes a value of "1" for the vehicle speed equal to or larger than 10 km/h. The value of the reducing coefficient KD varying in dependence on the vehicle speed may be altered in accordance with the displacement of the engine mounted on the vehicle, the vehicle weight, etc. Thus, if the vehicle speed is 5 km/h and the road traffic condition is a jammed road, then the reducing coefficient KD determined from the map is "⅔," so that the demanded driving torque Te is reduced in the multiplying unit 309 to ⅔ times, and is output as the target driving torque Toc.

The throttle opening controlling unit 311 supplies the controller 15 with a control signal which varies in dependence on the received target driving torque Toc, so that the initiation/termination of operation of the actuator 306 is controlled. The throttle opening controlling unit 311, which receives a judgment flag F supplied from an initiation/termination judging unit 312, transmits the control signal to the controller 15 when an initiation flag is caused to be set in response to the supply of the judgment flag F, so that the control of the actuator 306 is initiated. Also, the throttle opening controlling unit 311 terminates the transmission of the control signal to the controller 15 when the initiation flag is caused to be reset according to the judgment flag F supplied from the initiation/termination judging unit 312, so that the control of the actuator 306 is terminated.

The initiation/termination judging unit 312, which receives sensor signals from various sensors, makes a judgment based on these sensor signals. Specifically, if all the below-mentioned conditions (a) through (e) are satisfied, the initiation/termination judging unit 312 determines that the actuator control is to be initiated, and the initiation flag for the throttle opening controlling unit 311 is set by the judgment flag F supplied to the unit 311. This causes the throttle opening controlling unit 311 to transmit the control signal to the controller 15.

(a) The vehicle speed is, e.g., 0.5 km/h or less.

(b) A brake switch is in an OFF state.

(c) The accelerator opening is, e.g., 10% or more.

(d) The accelerator opening speed exceeds a predetermined speed.

(e) The gearshift position for the first speed is established in the transmission.

If any one of the below-mentioned conditions (f) through (i) is satisfied after the initiation of the control for the actuator 306 is determined by the initiation/termination judging unit 312, then the unit 312 determines that the actuator control is to be terminated, and the initiation flag is reset by the judgment flag F supplied to the throttle opening controlling unit 311, so that the unit 311 terminates transmitting the control signal to the controller 15.

(f) The vehicle speed is, e.g., 15 km/h or more.

(g) The brake switch is in an ON state.

(h) An idle switch is in an ON state.

(i) The gearshift position for the third speed or higher speed is established in the transmission.

Based on the target driving torque Toc calculated in the above manner, the TCL 307 controls the operation of the actuator 306. As a result, an accelerator opening vs. engine output characteristic becomes gentle when the vehicle runs forwardly intermittently at an extremely low speed on a jammed road. This enables the driver to start the vehicle smoothly, and produces other excellent effects such as easy accelerator operation on a jammed road.

The present invention is not limited to the foregoing first through fifth embodiments, but may be modified in various manners.

For instance, in the first embodiment, vehicle speed, accelerator opening degree, longitudinal acceleration and lateral acceleration are used as the parameters for which detection of the frequency distributions (frequency analyses) is to be made, and mean values and variances of the frequency distributions are used as parameters to be input to a neural network. However, it is not essential to use all of these parameters in carrying out the estimating method of the present invention. Other parameters may be used.

In the embodiment, parameters indicative of the road traffic condition are determined using the fuzzy inference, however, this is not essential.

In the embodiments related to the vehicle running characteristic control method, a weighted total sum of parameters supplied to the controller 15, serving as the neural network, is determined as an output parameter from the neural network, so as to easily accomplish the neural network function by the controller 15. However, the output parameter may alternatively be determined, by subjecting the weighted total sum of the input parameters to nonlinear conversion in the neural network.

Further, the controller 15 may be provided in each controlling apparatus.

Moreover, in the embodiments, explanations have been given to cases wherein the vehicle running characteristic is controlled, by adjusting the operating characteristic of a 4-wheel steering unit (rear-wheel steering unit), power steering unit, automatic transmission, or engine output control unit. However, the present invention can be applied to a vehicle equipped with various apparatuses, capable of variably adjusting the vehicle running characteristic, other than the above apparatuses.

From the above-described embodiments of the present invention, it is apparent that the present invention may be modified as would occur to one of ordinary skill in the art without departing from the spirit and scope of the present invention which should be defined solely by the appended claims. All such modifications as would be obvious to one of ordinary skill in the art should not be regarded as a departure from the spirit and scope of the invention, and should be included within the scope of the invention as defined solely by the appended claims.

What is claimed is:

1. A road traffic condition estimating method for estimating a traffic condition of a road on which a vehicle is traveling, comprising the steps of:

(a) calculating a traveling time ratio of the vehicle based upon a detected speed of the vehicle, the traveling time ratio being a ratio of traveling time of the vehicle to a total time including the traveling time and a stopping time of the vehicle;

(b) calculating an average speed of the vehicle; and (c) estimating the road traffic condition based on a relationship between said calculated traveling time ratio and said calculated average speed.

2. The road traffic condition estimating method according to claim 1 wherein said step (c) includes estimating a city area degree, corresponding to a likelihood of travel of the vehicle under driving conditions typical of driving in a city, as the road traffic condition.

3. The road traffic condition estimating method according to claim 2, wherein said step (c) includes determining that said city area degree is high when both said traveling time ratio and said average speed are at one of a low and medium level.

4. The road traffic condition estimating method according to claim 2, wherein said step (c) includes carrying out fuzzy inference to determine said city area degree based on a plurality of fuzzy rules, said plurality of fuzzy rules including a fuzzy rule by which said city area degree is determined to be high when both said traveling time ratio and said average speed are at a low level, and a fuzzy rule by which said city area degree is determined to be high when both said traveling time ratio and said average speed are at a medium level.

5. The road traffic condition estimating method according to claim 2, wherein said step (c) includes estimating an expressway degree, corresponding to a likelihood of travel of the vehicle under driving conditions typical of an expressway, based on a value which is obtained by subtracting said city area degree from a maximum calculated value of said city area degree, said maximum calculated value being subject to a predetermined maximum value.

6. The road traffic condition estimating method according to claim 1, wherein said step (c) includes estimating a jammed road degree, corresponding to a likelihood of travel of the vehicle under driving conditions typical of a traffic jam, as said road traffic condition.

7. The road traffic condition estimating method according to claim 6, wherein said step (c) includes determining that said jammed road degree is high when at least one of said traveling time ratio and said average speed are at a low level.

8. The road traffic condition estimating method according to claim 6 wherein said step (c) includes carrying out fuzzy inference to determine said jammed road degree based on a plurality of fuzzy rules, said plurality of fuzzy rules including a fuzzy rule by which said jammed road degree is determined to be high when said traveling time ratio is at a low level, and a fuzzy rule by which said jammed road degree is determined to be high when said average speed is at a low level.

9. The road traffic condition estimating method according to claim 1, further including the steps of:

(d) calculating an average lateral acceleration of the vehicle; and (e) determining a mountainous road degree, corresponding to a likelihood of travel of the vehicle under driving conditions typical of driving on a mountain road, based said calculated average lateral acceleration.

10. The road traffic condition estimating method according to claim 9, wherein said step (e) includes determining said mountainous road degree based on a stored map having a characteristic in which said mountainous road degree increases with an increase in said calculated average lateral acceleration.

11. The road traffic condition estimating method according to claim 1, wherein said step (c) estimates one of a city area degree, corresponding to a likelihood of travel of the vehicle under driving conditions typical of driving in a city, expressway degree, corresponding to a likelihood of travel of the vehicle under driving conditions typical of an expressway, and jammed road degree, corresponding to a likelihood of travel of the vehicle under driving conditions typical of a traffic jam as said estimated road traffic condition.

12. The road traffic condition estimating method according to claim 11, further including the steps of:

(d) calculating an average lateral acceleration of the vehicle; and (e) determining a mountainous road degree, corresponding to a likelihood of travel of the vehicle under driving conditions typical of driving on a mountain road, based said calculated average lateral acceleration.

13. The road traffic condition estimating method according to claim 1, further comprising:

(d) performing frequency analysis on at least one vehicle operating parameter indicative of an operating state of the vehicle; and (e) processing output of said steps (c) and (d) using a neural network to determine a desired vehicle maneuvering state.

14. The road traffic condition estimating method according to claim 13, wherein said step (d) performs frequency analysis on at least one of an accelerator depression amount, a longitudinal acceleration of the vehicle, and a lateral acceleration of the vehicle.

15. A method for controlling a characteristic of a vehicle in which a characteristic of a vehicle is variably controlled by variably controlling an operating characteristic of an apparatus mounted on the vehicle, comprising the steps of:

(a) calculating a traveling time ratio of the vehicle based upon a detected speed of the vehicle, the traveling time ratio being a ratio of traveling time of the vehicle to a total time including the traveling time and a stopping time of the vehicle;

(b) calculating an average speed of the vehicle;

(c) estimating a road traffic condition based on a relationship between said calculated traveling time ratio and said calculated average speed; and (d) variably controlling the operating characteristic of the apparatus mounted on the vehicle in accordance with the estimated road traffic condition.

16. The method of claim 15, wherein the apparatus mounted on the vehicle is a rear-wheel steering apparatus, and said step (d) includes setting target rear-wheel steering angle by multiplying one of a detected front-wheel steering value and a detected value of a vehicle behavior by a coefficient, and variably controlling said coefficient in accordance with said estimated road traffic condition.

17. The method of claim 15, wherein the apparatus mounted on the vehicle is a power steering unit and said step (d) includes variably controlling a ratio of a steering reaction force and vehicle speed characteristic of the power steering unit in accordance with said estimated road traffic condition, and changing a steering reaction force in accordance with vehicle speed.

18. The method of claim 15, wherein the apparatus mounted on the vehicle is an automatic transmission and said step (d) includes variably setting a speed change map in accordance with said estimated road traffic condition, the map being based on vehicle speed and throttle opening degree.

19. The method of claim 15, wherein the apparatus mounted on the vehicle is an engine output control unit and said step (d) includes variably controlling a ratio of an accelerator operation and an engine output characteristic of the engine output control unit in accordance with said estimated road traffic condition.

20. The road traffic condition estimating method according to claim 15, further including the steps of:

(e) calculating an average lateral acceleration of the vehicle; and (f) determining a mountainous road degree, corresponding to a likelihood of travel of the vehicle under driving conditions typical of driving on a mountain road, based said calculated average lateral acceleration; and wherein said step (d) variably controls said operating characteristic in accordance with the estimated road traffic condition and output of step (f).

21. The road traffic condition estimating method according to claim 15, wherein said step (c) estimates one of a city area degree, corresponding to a likelihood of travel of the vehicle under driving conditions typical of driving in a city, expressway degree, corresponding to a likelihood of travel of the vehicle under driving conditions typical of an expressway, and jammed road degree, corresponding to a likelihood of travel of the vehicle under driving conditions typical of a traffic jam as said estimated road traffic condition.

22. The method of claim 15, wherein the apparatus mounted on the vehicle is a rear-wheel steering apparatus; and said step (d) sets a rear-wheel steering angle based on said estimated road traffic condition.

23. The method of claim 22, wherein said step (d) comprises:

(d1) inputting at least one vehicle operating parameter indicative of an operating condition of the vehicle;

(d2) inputting at least one front-wheel steering parameter indicative of an operating condition of a front-wheel steering apparatus;

(d3) determining a rear-wheel steering mode based on the vehicle operating parameter;

(d4) determining a road surface condition based on the vehicle operating parameter and the front-wheel steering parameter; and (d5) setting the rear-wheel steering angle based the rear-wheel steering mode, the road surface condition, and the estimated road traffic condition.

24. The method of claim 15, wherein the apparatus mounted on the vehicle is a power steering unit; and said step (d) controls power steering force of the power steering unit based on at least the vehicle speed and the estimated road traffic condition.

25. The method of claim 24, wherein said step (d) reads the power steering force from a map based on the vehicle speed, and modifies the map based on the estimated road traffic condition.

26. The road traffic condition estimating method according to claim 25, further comprising:

(e) performing frequency analysis on at least one vehicle operating parameter indicative of an operating state of the vehicle; and (f) processing output of said steps (c) and (e) using a neural network to determine a desired vehicle maneuvering state; and wherein said step (d) reads the power steering force from a map based on the vehicle speed, and modifies the map based on the estimated road traffic condition and the desired vehicle maneuvering state.

27. The method of claim 15, wherein the apparatus mounted on the vehicle is an automatic transmission; and said step (d) includes the steps of, (d1) determining at least one shift change parameter indicative of whether the automatic transmission should effect a shift change;

(d2) adjusting the shift change parameter based on the estimated road traffic condition; and (d3) shifting the automatic transmission based on the adjusted shift change parameter.

28. The method of claim 27, wherein said step (d1) reads the shift change parameter from a map based on the vehicle speed and a throttle degree opening of a throttle for an engine of the vehicle.

29. The road traffic condition estimating method according to claim 27, further comprising:

(e) performing frequency analysis on at least one vehicle operating parameter indicative of an operating state of the vehicle; and (f) processing output of said steps (c) and (e) using a neural network to determine a desired vehicle maneuvering state; and wherein said step (d2) adjusts the shift change parameter based on the estimated road traffic condition and the desired maneuvering state.

30. The method of claim 15, wherein the apparatus mounted on the vehicle is an engine output control unit which controls output of an engine of the vehicle; and said step (d) adjusts an amount of engine output set by the engine output control unit based on the estimated road traffic condition.

31. A road traffic condition estimating apparatus for estimating a traffic condition of a road on which a vehicle is traveling, comprising:

traveling time ratio detecting means for calculating a traveling time ratio of the vehicle based upon a detected speed of the vehicle, the traveling time ratio being a ratio of traveling time of the vehicle to a total time including the traveling time and a stopping time of the vehicle;

average speed detecting means for calculating an average speed of the vehicle; and road traffic condition estimating means for estimating the road traffic condition based on a relationship between said calculated traveling time ratio and said calculated average speed.

32. The road traffic condition estimating apparatus according to claim 31, wherein said road traffic condition estimating means estimates a city area degree, corresponding to a likelihood of travel of the vehicle under driving conditions typical of driving in a city, as the road traffic condition.

33. The road traffic condition estimating apparatus according to claim 32, wherein said road traffic condition estimating means determines that said city area degree is high when both said traveling time ratio and said average speed are at one of low and medium level.

34. The road traffic condition estimating apparatus according to claim 32, wherein said road traffic condition estimating means carries out fuzzy inference to determine said city area degree based on a plurality of fuzzy rules, said plurality of fuzzy rules including a fuzzy rule by which said city area degree is determined to be high when both said traveling time ratio and said average speed are at a low level, and a fuzzy rule by which said city area degree is determined to be high when both said traveling time ratio and said average speed are at a medium level.

35. The road traffic condition estimating apparatus according to claim 32, wherein said road traffic condition estimating means estimates an expressway degree, corresponding to a likelihood of travel of the vehicle under driving conditions typical of an expressway, based on a value which is obtained by subtracting said city area degree from a maximum calculated value of said city area degree, said maximum calculated value being subject to a predetermined maximum value.

36. The road traffic condition estimating apparatus according to claim 31, wherein said road traffic condition estimating means estimates a jammed road degree, corresponding to a likelihood of travel of the vehicle under driving conditions typical of a traffic jam, as said road traffic condition.

37. The road traffic condition estimating apparatus according to claim 36, wherein said road traffic condition estimating means determines that said jammed road degree is high when at least one of said traveling time ratio and said average speed are at a low level.

38. The road traffic condition estimating apparatus according to claim 36, wherein said road traffic condition estimating means carries out fuzzy inference to determine said jammed road degree based on a plurality of fuzzy rules, said plurality of fuzzy rules including a fuzzy rule by which said jammed road degree is determined to be high when said traveling time ratio is at a low a level, and a fuzzy rule by which said jammed road degree is determined to be high when said average speed is at a low level.

39. The road traffic condition estimating apparatus according to claim 31, further including:

average lateral acceleration detecting means for calculating an average lateral acceleration of the vehicle; and mountainous road degree estimating means for determining a mountainous road degree, corresponding to a likelihood of travel of the vehicle under driving conditions typical of driving on a mountain road, based said average lateral acceleration.

40. The road traffic condition estimating apparatus according to claim 39, wherein said mountainous road degree estimating means determines said mountainous road degree based on a stored map having a characteristic in which said mountainous road degree increases with an increase in said calculated average lateral acceleration.

41. The road traffic condition estimating apparatus according to claim 31, wherein said road traffic estimating means estimates one of a city area degree, corresponding to a likelihood of travel of the vehicle under driving conditions typical of driving in a city, expressway degree, corresponding to a likelihood of travel of the vehicle under driving conditions typical of an expressway, and jammed road degree, corresponding to a likelihood of travel of the vehicle under driving conditions typical of a traffic jam as said estimated road traffic condition.

42. The road traffic condition estimating apparatus according to claim 41, further including:

average lateral acceleration detecting means for calculating an average lateral acceleration of the vehicle; and mountainous road degree estimating means for determining a mountainous road degree, corresponding to a likelihood of travel of the vehicle under driving conditions typical of driving on a mountain road, based on said average lateral acceleration.

43. The road traffic condition estimating apparatus according to claim 31, further comprising:

frequency analysis means for performing frequency analysis on at least one vehicle operating parameter indicative of an operating state of the vehicle; and a neural network processing output of said frequency analysis means and the estimated road traffic condition to determine a desired vehicle maneuvering state.

44. The road traffic condition estimating apparatus according to claim 43, wherein said frequency analysis means performs frequency analysis on at least one of an accelerator depression amount, a longitudinal acceleration of the vehicle, and a lateral acceleration of the vehicle.

45. An apparatus for controlling a characteristic of a vehicle in which a characteristic of a vehicle is variably controlled by variably controlling an operating characteristic of an apparatus mounted on the vehicle, comprising:

traveling time ratio detecting means for calculating a traveling time ratio of the vehicle based upon a detected speed of the vehicle, the traveling time ratio being a ratio of traveling time of the vehicle to a total time including the traveling time and a stopping time of the vehicle;

average speed detecting means for calculating an average speed of the vehicle;

road traffic condition estimating means for estimating a road traffic condition based on a relationship between said calculated traveling time ratio and said calculated average speed; and characteristic controlling means for variably controlled controlling the operating characteristic of the apparatus mounted on the vehicle in accordance with the estimated road traffic condition.

46. The apparatus of claim 45, wherein the apparatus mounted on the vehicle is a rear-wheel steering apparatus, and wherein a target rear-wheel steering angle is set by multiplying one of a detected front-wheel steering value and a detected value of a vehicle behavior by a coefficient, said coefficient being variably controlled by said characteristic controlling means in accordance with said estimated road traffic condition.

47. The apparatus of claim 45, wherein the apparatus mounted on the vehicle is a power steering unit and said characteristic controlling means variably controls a ratio of a steering reaction force and vehicle speed characteristic of the power steering unit in accordance with said estimated road traffic condition, and changes a steering reaction force in accordance with vehicle speed.

48. The apparatus of claim 45, wherein the apparatus mounted on the vehicle is an automatic transmission and said characteristic controlling means variably sets a speed change map in accordance with said estimated road traffic condition, the map being based on vehicle speed and throttle opening degree.

49. The apparatus of claim 45, wherein the apparatus mounted on the vehicle is an engine output control unit and said characteristic controlling means variably controls a ratio of an accelerator operation and an engine output characteristic of the engine output control unit in accordance with said estimated road traffic condition.

50. The road traffic condition estimating apparatus according to claim 45, further including:
average lateral acceleration detecting means for calculating an average lateral acceleration of the vehicle; and
mountainous road degree estimating means for determining a mountainous road degree, corresponding to a likelihood of travel of the vehicle under driving conditions typical of driving on a mountain road, based on said average lateral acceleration; and wherein
said characteristic controlling means variably controls the operating characteristic in accordance with the estimated road traffic condition and output of the mountainous degree estimating means.

51. The road traffic condition estimating apparatus according to claim 45, wherein said road traffic estimating means estimates one of a city area degree, corresponding to a likelihood of travel of the vehicle under driving conditions typical of driving in a city, expressway degree, corresponding to a likelihood of travel of the vehicle under driving conditions typical of an expressway, and jammed road degree, corresponding to a likelihood of travel of the vehicle under driving conditions typical of a traffic jam as said estimated road traffic condition.

52. The apparatus of claim 45, wherein
the apparatus mounted on the vehicle is a rear-wheel steering apparatus; and
said characteristic controlling means sets a rear-wheel steering angle based on said estimated road traffic condition.

53. The apparatus of claim 45, wherein said characteristic controlling means inputs at least one vehicle operating parameter indicative of an operating condition of the vehicle and at least one front-wheel steering parameter indicative of an operating condition of a front-wheel steering apparatus, determines a rear-wheel steering mode based on the vehicle operating parameter, determines a road surface condition based on the vehicle operating parameter and the front-wheel steering parameter, and sets the rear-wheel steering angle based the rear-wheel steering mode, the road surface condition, and the estimated road traffic condition.

54. The apparatus of claim 45, wherein
the apparatus mounted on the vehicle is a power steering unit; and
said characteristic controlling means controls power steering force of the power steering unit based on at least the vehicle speed and the estimated road traffic condition.

55. The apparatus of claim 54, wherein said characteristic controlling means reads the power steering force from a map based on the vehicle speed, and modifies the map based on the estimated road traffic condition.

56. The road traffic condition estimating apparatus according to claim 54, further comprising:
frequency analysis means for performing frequency analysis on at least one vehicle operating parameter indicative of an operating state of the vehicle;
a neural network processing output of said frequency analysis means and the estimated road traffic condition to determine a desired vehicle maneuvering state; and wherein
said characteristic controlling means reads the power steering force from a map based on the vehicle speed, and modifies the map based on the estimated road traffic condition and the desired vehicle maneuvering state.

57. The apparatus of claim 45, wherein
the apparatus mounted on the vehicle is an automatic transmission; and
said characteristic controlling means determines at least one shift change parameter indicative of whether the automatic transmission should effect a shift change, adjusts the shift change parameter based on the estimated road traffic condition, and shifts the automatic transmission based on the adjusted shift change parameter.

58. The apparatus of claim 57, wherein
said characteristic controlling means reads the shift change parameter from a map based on the vehicle speed and a throttle degree opening of a throttle for an engine of the vehicle.

59. The road traffic condition estimating apparatus according to claim 57, further comprising:
frequency analysis means for performing frequency analysis on at least one vehicle operating parameter indicative of an operating state of the vehicle;
a neural network processing output of said frequency analysis means and the estimated road traffic condition to determine a desired vehicle maneuvering state; and wherein
said characteristic controlling means adjusts the shift change parameter based on the estimated road traffic condition and the desired maneuvering state.

60. The apparatus of claim 45, wherein
the apparatus mounted on the vehicle is an engine output control unit which controls output of an engine of the vehicle; and
said characteristic controlling means adjusts an amount of engine output set by the engine output control unit based on the estimated road traffic condition.

* * * * *